United States Patent [19]
Wu

[11] Patent Number: 5,659,780
[45] Date of Patent: Aug. 19, 1997

[54] PIPELINED SIMD-SYSTOLIC ARRAY PROCESSOR AND METHODS THEREOF

[76] Inventor: Chen-Mie Wu, 2Fl., No. 10, Lane 36, Sec. 3, Hsing Lung Road, Taipei, Taiwan

[21] Appl. No.: 260,393

[22] Filed: Jun. 15, 1994

[30] Foreign Application Priority Data

Feb. 24, 1994 [CN] China .................. 94101719.2

[51] Int. Cl.$^6$ .................................................. G06F 15/80
[52] U.S. Cl. ..................... 395/800.19; 364/DIG. 1; 364/724.12; 364/728.01; 364/231.9; 395/376; 395/800.11
[58] Field of Search ............... 395/800, 27; 364/DIG. 1, 364/724.12, 728.01; 382/49; 371/37

[56] References Cited

U.S. PATENT DOCUMENTS

| | | | |
|---|---|---|---|
| 4,546,445 | 10/1985 | Haugen | 364/728 |
| 4,665,523 | 5/1987 | Citron et al. | 371/37 |
| 4,783,738 | 11/1988 | Li et al. | 364/DIG. 1 |
| 4,835,775 | 5/1989 | Seroussi | 371/37 |
| 5,091,864 | 2/1992 | Baji et al. | 395/27 |
| 5,138,695 | 8/1992 | Means et al. | 395/27 |
| 5,253,308 | 10/1993 | Johnson | 382/49 |
| 5,305,462 | 4/1994 | Grondalski | 395/800 |
| 5,471,627 | 11/1995 | Means et al. | 395/800 |

OTHER PUBLICATIONS

McWhirter et al., "On the Formal Derivation of a Systolic Array for Recursive Least Squares Estimation", IEEE, 1994, pp. 329–332.

Shimokawa et al., "A Parallel ASIC VLSI Neurocomputer For a Large Number of Neurons and Billion Connections Per Second Speed", IEEE, 1991, pp. 2162–2167.

*Primary Examiner*—Eric Coleman
*Assistant Examiner*—Walter D. Davis
*Attorney, Agent, or Firm*—Bacon & Thomas

[57] ABSTRACT

A pipelined SIMD-systolic array processor and its methods, mainly comprising a number of processing elements constructed as array architecture, multiport memory, registers, multiplexers, and controller, wherein the registers and multiplexers are connected for transferring data between the multiport memory and processing elements, the methods thereof uses a way which combines both broadcasting and systolic structures for transferring data into and out each processing element, and moreover, the method uses the controller to manipulate data transferring and the operation of each processing element for various functions; the array processor can have a faster processing speed and, through using a multiport memory, each processing element requires only a small amount of storage, and therefore, the array processor can use memory in a more efficient way.

33 Claims, 35 Drawing Sheets

ROM

| Mode Control | | | C0 | C1 | C2 | C3 | C4 | C5 | C6 | C7 |
|---|---|---|---|---|---|---|---|---|---|---|
| 0 | 0 | 0 | 0 | 1 | 0 | 0 | 0 | 0 | 0 | 1 |
| 0 | 0 | 1 | 0 | 0 | 0 | 0 | 1 | 0 | 0 | 1 |
| 0 | 1 | 0 | 0 | 1 | 0 | 1 | 0 | 0 | 1 | 0 |
| 0 | 1 | 1 | 0 | 0 | 0 | 1 | 0 | — | — | 0 |
| 1 | 0 | 0 | 1 | 0 | 0 | 1 | 1 | 0 | 0 | 1 |
| 1 | 0 | 1 | — | — | — | — | — | 1 | 0 | 1 |
| 1 | 1 | 0 | — | — | — | — | — | — | — | — |
| 1 | 1 | 1 | — | — | — | — | — | — | — | — |

*FIG. 3*

| Cycle | ms1 | is1 | is2 | mb | ib | PE1 963 | 964 | PE2 963 | 964 | 3 | 8 |
|---|---|---|---|---|---|---|---|---|---|---|---|
| 1 | a10 | — | — | — | — | — | — | — | — | 1 | — |
| 2 | a00 | a10 | — | — | — | 0 | — | 0 | — | 1 | — |
| 3 | a11 | a00 | a10 | — | — | 1 | 0 | 1 | 0 | 1 | — |
| 4 | a01 | a11 | — | — | — | 0 | — | 0 | — | 1 | — |
| 5 | a12 | a01 | a11 | — | — | 1 | 1 | 1 | 1 | 1 | — |
| 6 | a02 | a12 | — | — | — | 0 | — | 0 | — | 1 | — |
| 7 | a13 | a02 | a12 | — | — | 1 | 2 | 1 | 2 | 1 | — |
| 8 | a03 | a13 | — | — | — | 0 | — | 0 | — | 1 | — |
| 9 | a30 | a03 | a13 | — | — | 1 | 3 | 1 | 3 | 1 | — |
| 10 | a20 | a30 | — | — | — | 0 | — | 0 | — | 1 | — |
| 11 | a31 | a20 | a30 | — | — | 1 | 4 | 1 | 4 | 1 | — |
| 12 | a21 | a31 | — | — | — | 0 | — | 0 | — | 1 | — |
| 13 | a32 | a21 | a31 | — | — | 1 | 5 | 1 | 5 | 1 | — |
| 14 | a22 | a32 | — | — | — | 0 | — | 0 | — | 1 | — |
| 15 | a33 | a22 | a32 | — | — | 1 | 6 | 1 | 6 | 1 | — |
| 16 | a23 | a33 | — | — | — | 0 | — | 0 | — | 1 | — |
| 17 | | a23 | a33 | — | — | 1 | 7 | 1 | 7 | 1 | — |

| Cycle | rs21 | rs22 | rs11 | rs12 | rb | ib | is1 | is2 | 106 | 110 | 01 | 106 | 110 | 02 | r01 | r02 | 6 | 12 | 931 | 94 | 933 |
|---|---|---|---|---|---|---|---|---|---|---|---|---|---|---|---|---|---|---|---|---|---|
| 1 | x1 | — | — | — | — | — | — | — | — | — | — | — | — | — | — | — | 1 | 1 | 1 | 0 | 1 |
| 2 | x0 | x1 | — | — | a0 | a0 | x0 | x1 | — | — | — | — | — | — | — | — | 0 | 1 | 1 | 0 | 1 |
| 3 | — | — | x-1 | x0 | a1 | a1 | x-1 | x0 | a0x0 | — | a0x0 | a0x1 | — | a0x1 | — | — | 1 | 1 | 1 | 1 | 1 |
| 4 | — | — | x-2 | x-1 | a2 | a2 | x-2 | x-1 | a1x-1 | a0x0 | a0x0+a1x-1 | a1x0 | a0x1 | a0x1+a1x0 | — | — | 1 | 1 | 1 | 0 | 1 |
| 5 | x3 | — | x-3 | x-2 | a3 | a3 | x-3 | x-2 | a2x-2 | a0x0+a1x-1 | a0x0+a1x-1+a2x-2 | a2x-1 | a0x1+a1x0 | a0x1+a1x0+a2x-1 | — | — | 1 | 1 | 1 | 0 | 1 |
| 6 | x2 | x3 | — | — | a0 | a0 | x2 | x3 | a3x-3 | a0x0+a1x-1+a2x-2 | y0 | a3x-2 | a0x1+a1x0+a2x-1 | y1 | — | — | 0 | 0 | 1 | 0 | 1 |
| 7 | — | — | x1 | x2 | a1 | a1 | x1 | x2 | a0x2 | — | a0x2 | a0x3 | — | a0x3 | y0 | y1 | 1 | 1 | 1 | 0 | 1 |
| 8 | — | — | x0 | x1 | a2 | a2 | x0 | x1 | a1x1 | a0x2 | a0x2+a1x1 | a1x2 | a0x3 | a0x3+a1x2 | y1 | — | 1 | 1 | 1 | 1 | 1 |
| 9 | x5 | — | x-1 | x0 | a3 | a3 | x-1 | x0 | a2x0 | a0x2+a1x1 | a0x2+a1x1+a2x0 | a2x1 | a0x3+a1x2 | a0x3+a1x2+a2x1 | — | — | 1 | 1 | 1 | 0 | 1 |
| 10 | x4 | x5 | — | — | a0 | a0 | x4 | x5 | a3x1 | a0x2+a1x1+a2x0 | y2 | a3x0 | a0x3+a1x2+a2x1 | y3 | y2 | y3 | 0 | 0 | 1 | 1 | 1 |
| 11 | — | — | x3 | x4 | a1 | a2 | x3 | x4 | a0x4 | — | a0x4 | a0x5 | — | a0x5 | y3 | — | 1 | 1 | 1 | 0 | 1 |
| 12 | — | — | — | — | — | — | — | — | — | — | — | — | — | — | — | — | 1 | 1 | 1 | 1 | 1 |
| 13 | — | — | — | — | — | — | — | — | — | — | — | — | — | — | — | — | 1 | 1 | 1 | 0 | 1 |
| 14 | — | — | — | — | — | — | — | — | — | — | — | — | — | — | — | — | … | … | … | … | … |

| Cycle | rs21 | rs22 | rs11 | rs12 | rb | ib | is1 | is2 | 106 | 110 | o1 | ob1 | 106 | 110 | o2 | ob2 | ob | ro1 | ro2 | 2 | 6 | 7 | 933 | 931 | 94 | 971 | 973 | 95 | 12 | 972 | 974 |
|---|---|---|---|---|---|---|---|---|---|---|---|---|---|---|---|---|---|---|---|---|---|---|---|---|---|---|---|---|---|---|---|
| 1 | x1 | — | — | — | — | — | — | — | — | — | — | — | — | — | — | — | — | — | — | 0 | 1 | 1 | 0 | 0 | 0 | 0 | 0 | 0 | 1 | 1 | 1 |
| 2 | x0 | x1 | — | — | a0 | a0 | x0 | x1 | — | — | — | — | — | — | — | — | — | — | — | 0 | 0 | 1 | 0 | 1 | 0 | 0 | 0 | 0 | 1 | 1 | 1 |
| 3 | — | — | x-1 | x0 | a1 | a1 | x-1 | x0 | a0x0 | a0x0 | a0x0 | — | a0x1 | a0x1 | a0x1 | — | — | — | — | 1 | 1 | 1 | 1 | 1 | 1 | 0 | 0 | 0 | 1 | 1 | 1 |
| 4 | — | — | x-2 | x-1 | a2 | a2 | x-2 | x-1 | a1x-1 | a0x0+a1x-1 | a0x0+a1x-1 | — | a1x0 | a0x1+a1x0 | a0x1+a1x0 | — | — | — | — | 0 | 0 | 1 | 1 | 1 | 0 | 0 | 0 | 0 | 1 | 1 | 1 |
| 5 | 0 | 0 | x-3 | x-2 | a3 | a3 | x-3 | x-2 | a2x-2 | a0x0+a1x-1+a2x-2 | a0x0+a1x-1+a2x-2 | — | a2x-1 | a0x1+a1x0+a2x-1 | a0x1+a1x0+a2x-1 | — | — | — | — | 0 | 1 | 1 | 1 | 1 | 0 | 0 | 0 | 0 | 1 | 1 | 1 |
| 6 | -b3 | 0 | — | — | y-3 | y-3 | -b3 | 0 | a3x-3 | x0 | x0 | — | a3x-2 | x1 | x1 | — | — | — | — | 0 | 0 | 1 | 1 | 1 | 0 | 0 | 0 | 0 | 1 | 1 | 1 |
| 7 | — | — | -b2 | -b3 | y-2 | y-2 | -b2 | -b3 | -b3y-3 | -b3y-3+x0 | -b3y-3+x0 | — | 0 | x1 | x1 | — | — | — | — | 0 | 1 | 1 | 1 | 1 | 0 | 0 | 0 | 0 | 1 | 1 | 1 |
| 8 | — | — | -b1 | -b2 | y-1 | y-1 | -b1 | -b2 | -b2y-2 | -b2y-2+-b3y-3+x0 | -b2y-2+-b3y-3+x0 | — | -b3y-2 | -b3y-2+x1 | -b3y-2+x1 | — | — | — | — | 0 | 1 | 1 | 1 | 1 | 0 | 0 | 0 | 0 | 1 | 1 | 1 |
| 9 | — | — | -b1 | -b2 | y-1 | y-1 | -b1 | -b2 | -b1y-1 | — | — | — | -b2y-1 | -b2y-1+-b3y-2+x1 | -b2y-1+-b3y-2+x1 | — | — | — | — | 0 | 1 | 1 | 1 | 1 | 0 | 0 | 1 | 0 | 1 | 0 | 0 |
| 10 | x3 | — | -b1 | — | y0 | y0 | 0 | -b1 | 0 | y0 | y0 | y0 | -b1y0 | -b2y-1+-b3y-2+x1 | -b2y-1+-b3y-2+x1 | — | y0 | — | — | 0 | 1 | 1 | 1 | 1 | 0 | 1 | 1 | 1 | 0 | 0 | 0 |
| 11 | x2 | x3 | 0 | — | a0 | a0 | x3 | — | a0x2 | y0 | y0 | — | — | -b1y0 | y1 | — | — | y0 | y1 | 1 | 1 | 0 | 0 | 1 | 1 | 0 | 0 | 0 | 1 | 1 | 1 |
| 12 | — | — | — | — | a1 | a1 | x2 | x3 | a1x1 | a0x2 | a0x2 | — | a0x3 | a0x3 | a0x3 | — | — | y1 | — | 0 | 1 | 1 | 1 | 1 | 1 | 0 | 0 | 0 | 0 | 1 | 1 |
| 13 | — | — | x0 | — | a2 | a2 | x1 | x2 | a2x0 | a0x2+a1x1 | a0x2+-a1x1 | — | a1x2 | a0x3+a1x2 | a0x3+a1x2 | — | — | — | — | 1 | 1 | 1 | 1 | 1 | 1 | 0 | 0 | 0 | 1 | 1 | 1 |
| 14 | 0 | — | x-1 | x0 | a3 | a3 | x0 | x1 | — | — | a0x2+a1x1+a2x0 | — | a2x1 | a0x3+a1x2+a2x1 | a0x3+a1x2+a2x1 | — | — | — | — | 0 | 1 | 1 | 1 | 1 | 0 | 0 | 0 | 0 | 1 | 1 | 1 |
| 15 | | | | | | | | | | | | | | | | | | | | | | | | | | | | | | | |
| 16 | | | | | | | | | | | | | | | | | | | | | | | | | | | | | | | |

PE1

| Cycle | rs21 | rs22 | rs23 | rs24 | rs11 | rs12 | rs13 | rs14 | ib | is1 | 106 | 110 | 01 | oi1 |
|---|---|---|---|---|---|---|---|---|---|---|---|---|---|---|
| 1 | x00 | — | — | — | — | — | — | — | — | — | — | — | — | — |
| 2 | x10 | x00 | — | — | — | — | — | — | — | — | — | — | — | — |
| 3 | x20 | x10 | x00 | — | — | — | — | — | — | — | — | — | — | — |
| 4 | x30 | x20 | x10 | x00 | — | — | — | — | w00 | x30 | — | — | — | — |
| 5 | x01 | — | — | — | x40 | x30 | x20 | x10 | w10 | x40 | x30w00 | — | x30w00 | — |
| 6 | x11 | x01 | — | — | x50 | x40 | x30 | x20 | w20 | x50 | x40w10 | x30w00 | rA + x40w10 | — |
| 7 | x21 | x11 | x01 | — | — | — | — | — | — | — | x50w20 | ⋮ | ⋮ | — |
| 8 | x31 | x21 | x11 | x01 | — | — | — | — | w01 | x31 | — | ⋮ | ⋮ | — |
| 9 | x02 | — | — | — | x41 | x31 | x21 | x11 | w11 | x41 | x31w01 | | | — |
| 10 | x12 | x02 | — | — | x51 | x41 | x31 | x21 | w21 | x51 | x41w11 | | | — |
| 11 | x22 | x12 | x02 | — | — | — | — | — | — | — | x51w21 | | | — |
| 12 | x32 | x22 | x12 | x02 | — | — | — | — | w02 | x32 | — | | | — |
| 13 | — | — | — | — | x42 | x32 | x22 | x12 | w12 | x42 | x32w02 | | | — |
| 14 | — | — | — | — | x52 | x42 | x32 | x22 | w22 | x52 | x42w12 | | | — |
| 15 | — | — | — | — | — | — | — | — | w00 | x31 | x52w22 | | (y30) | x31 |
| 16 | — | — | — | — | x41 | x31 | x21 | x11 | w10 | x41 | x31w00 | | x31w00 | — |
| 17 | — | — | — | — | x51 | x41 | x31 | x21 | w20 | x51 | x41w10 | x31w00 | rA + x41w10 | — |
| 18 | x03 | — | — | — | x32 | x22 | x12 | x02 | w01 | x32 | x51w20 | ⋮ | ⋮ | x32 |
| 19 | x13 | x03 | — | — | x42 | x32 | x22 | x12 | w11 | x42 | x32w01 | ⋮ | ⋮ | — |
| 20 | x23 | x13 | x03 | — | x52 | x42 | x32 | x22 | w21 | x52 | x42w11 | | | — |
| 21 | x33 | x23 | x13 | x03 | — | — | — | — | w02 | x33 | x52w21 | | | x33 |
| 22 | — | — | — | — | x43 | x33 | x23 | x13 | w12 | x43 | x33w02 | | | — |
| 23 | — | — | — | — | x53 | x43 | x33 | x23 | w22 | x53 | x43w12 | | | — |
| 24 | | | | | | | | | | | x53w22 | | (y31) | — |

FIG. 18A

| Cycle | is2 | 106 | 110 | o2 | oi2 | is3 | 106 | 110 | o3 | oi3 | is4 | 106 | 110 | o4 | oi4 | ro1 | ro2 | ro3 | ro4 |
|---|---|---|---|---|---|---|---|---|---|---|---|---|---|---|---|---|---|---|---|
| 1 | — | — | — | — | — | — | — | — | — | — | — | — | — | — | — | — | — | — | — |
| 2 | — | — | — | — | — | — | — | — | — | — | — | — | — | — | — | — | — | — | — |
| 3 | — | — | — | — | — | — | — | — | — | — | — | — | — | — | — | — | — | — | — |
| 4 | x20 | — | — | — | — | x10 | — | — | — | — | x00 | — | — | — | — | — | — | — | — |
| 5 | x30 | x20w00 | — | x20w00 | — | x20 | x10w00 | — | x10w00 | — | x10 | x00w00 | — | x00w00 | — | — | — | — | — |
| 6 | x40 | x30w10 | x20w20 | x20w30 | — | x30 | x20w10 | x10w20 | rA + x10w00 | — | x20 | x10w10 | x00w20 | rA + x00w10 | — | — | — | — | — |
| 7 | — | x40w20 | ⋮ | ⋮ | — | — | x30w20 | ⋮ | ⋮ | — | — | x20w20 | ⋮ | ⋮ | — | — | — | — | — |
| 8 | x21 | — | ⋮ | ⋮ | — | x11 | — | ⋮ | ⋮ | — | x01 | — | ⋮ | ⋮ | — | — | — | — | — |
| 9 | x31 | x21w01 | | | — | x21 | x11w01 | | | — | x11 | x01w01 | | | — | — | — | — | — |
| 10 | x41 | x31w11 | | | — | x31 | x21w11 | | | — | x21 | x11w11 | | | — | — | — | — | — |
| 11 | — | x41w01 | | | — | — | x31w21 | | | — | — | x21w21 | | | — | — | — | — | — |
| 12 | x22 | — | | | — | x12 | — | | | — | x02 | — | | | — | — | — | — | — |
| 13 | x32 | x22w02 | | | — | x22 | x12w02 | | | — | x12 | x02w02 | | | — | — | — | — | — |
| 14 | x42 | x32w12 | | | — | x32 | x22w12 | | | — | x22 | x12w12 | | | — | — | — | — | — |
| 15 | x21 | x42w22 | | (y20) | x21 | x11 | x32w22 | | (y10) | x11 | x01 | x22w22 | | (y00) | x01 | — | — | — | — |
| 16 | x31 | x21w00 | | x21w00 | — | x21 | x11w00 | | x11w00 | — | x11 | x01w00 | | x01w00 | — | y30 | y20 | y10 | y00 |
| 17 | x41 | x31w10 | x21w00 | rA + x31w10 | — | x31 | x21w10 | x11w00 | rA + x21w10 | — | x21 | x11w10 | x10w00 | rA + x11w10 | — | y20 | y10 | y00 | — |
| 18 | x22 | x41w20 | ⋮ | ⋮ | x22 | x12 | x31w20 | ⋮ | ⋮ | — | x12 | x02 | x21w20 | ⋮ | ⋮ | x02 | y10 | y00 | — | — |
| 19 | x32 | x22w01 | ⋮ | ⋮ | — | x22 | x12w01 | ⋮ | ⋮ | — | x12 | x02w01 | ⋮ | ⋮ | — | y00 | — | — | — |
| 20 | x42 | x32w11 | | | — | x32 | x22w11 | | | — | x22 | x12w11 | | | — | — | — | — | — |
| 21 | x23 | x42w21 | | | x23 | x13 | x32w21 | | | x13 | x03 | x22w21 | | | x03 | — | — | — | — |
| 22 | x33 | x23w02 | | | — | x23 | x13w02 | | | — | x13 | x03w02 | | | — | — | — | — | — |
| 23 | x43 | x33w12 | | | — | x33 | x23w12 | | | — | x23 | x13w12 | | | — | — | — | — | — |
| 24 | | x43w22 | | (y21) | — | x33w22 | | | (y11) | — | x23w22 | | | (y01) | — | — | — | — | — |

FIG. 18B

| Cycle | 5 | 6 | 913 | 911 | 912 | 931 | 94 | 933 | 12 |
|---|---|---|---|---|---|---|---|---|---|
| 1 | 1 | 1 | 1 | 0 | 0 | 1 | 0 | 1 | 1 |
| 2 | 1 | 1 | 0 | 0 | 0 | 1 | 0 | 1 | 1 |
| 3 | 1 | 1 | 0 | 0 | 0 | 1 | 0 | 1 | 1 |
| 4 | 1 | 0 | 0 | 0 | 0 | 1 | 0 | 1 | 1 |
| 5 | 1 | 1 | 0 | 0 | 0 | 1 | 1 | 1 | 1 |
| 6 | 1 | 1 | 0 | 0 | 0 | 1 | 0 | 1 | 1 |
| 7 | 1 | 1 | 0 | 0 | 0 | 1 | 0 | 1 | 1 |
| 8 | 1 | 0 | 0 | 0 | 1 | 1 | 0 | 0 | 1 |
| 9 | 1 | 1 | 0 | 0 | 0 | 1 | 0 | 1 | 1 |
| 10 | 1 | 1 | 0 | 0 | 0 | 1 | 0 | 1 | 1 |
| 11 | 1 | 1 | 0 | 0 | 0 | 1 | 0 | 1 | 1 |
| 12 | 1 | 0 | 0 | 0 | 1 | 1 | 0 | 0 | 1 |
| 13 | 1 | 1 | 0 | 0 | 0 | 1 | 0 | 1 | 1 |
| 14 | 1 | 1 | 0 | 0 | 0 | 1 | 0 | 1 | 1 |
| 15 | 0 | 1 | 0 | 1 | 0 | 1 | 0 | 1 | 0 |
| 16 | 1 | 1 | 0 | 0 | 0 | 1 | 1 | 1 | 1 |
| 17 | 1 | 1 | 0 | 0 | 0 | 1 | 0 | 1 | 1 |
| 18 | 0 | 1 | 0 | 1 | 1 | 1 | 0 | 1 | 1 |
| 19 | 1 | 1 | 0 | 0 | 0 | 1 | 0 | 1 | 1 |
| 20 | 1 | 1 | 0 | 0 | 0 | 1 | 0 | 1 | 1 |
| 21 | 1 | 0 | 0 | 0 | 1 | 1 | 0 | 1 | 1 |
| 22 | 1 | 1 | 0 | 0 | 0 | 1 | 0 | 1 | 1 |
| 23 | 1 | 1 | 0 | 0 | 0 | 1 | 0 | 1 | 1 |
| 24 | 1 | 1 | 0 | 0 | 0 | 1 | 0 | 1 | 0 |

FIG. 19

| Cycle | rs11 | rs12 | rs13 | PE1 963 | 964 | PE2 963 | 964 | PE3 963 | 964 |
|---|---|---|---|---|---|---|---|---|---|
| 1 | a20 | — | — | 0 | — | 0 | — | 0 | — |
| 2 | a10 | a20 | — | 0 | — | 0 | — | 0 | — |
| 3 | a00 | a10 | a20 | 1 | 0 | 1 | 0 | 1 | 0 |
| 4 | a21 | — | — | 0 | — | 0 | — | 0 | — |
| 5 | a11 | a21 | — | 0 | 1 | 0 | 1 | 0 | 1 |
| 6 | a01 | a11 | a21 | 1 | 1 | 1 | 1 | 1 | 1 |
| 7 | a22 | — | — | 0 | — | 0 | — | 0 | — |
| 8 | a12 | a22 | — | 0 | — | 0 | — | 0 | — |
| 9 | a02 | a12 | a22 | 1 | 2 | 1 | 2 | 1 | 2 |

| Cycle | 961 | 962 | 973 | 974 | 971 | 972 | 95 | 94 | 931 | 933 | r01 | r02 | r03 | 12 |
|---|---|---|---|---|---|---|---|---|---|---|---|---|---|---|
| 1 | 1 | 0 | 0 | — | 0 | — | 0 | 0 | 1 | 1 | — | — | — | 1 |
| 2 | 1 | 1 | 0 | — | 0 | — | 0 | 1 | 1 | 1 | — | — | — | 1 |
| 3 | 1 | 2 | 0 | — | 0 | — | 0 | 0 | 1 | 1 | — | — | — | 1 |
| 4 | 1 | 0 | 1 | 0 | 0 | — | 0 | 0 | 1 | 1 | — | — | — | 1 |
| 5 | 1 | 1 | 0 | — | 0 | — | 0 | 1 | 1 | 1 | — | — | — | 1 |
| 6 | 1 | 2 | 0 | — | 0 | — | 0 | 0 | 1 | 1 | — | — | — | 1 |
| 7 | 1 | 0 | 1 | 1 | 0 | — | 0 | 0 | 1 | 1 | — | — | — | 1 |
| 8 | 1 | 1 | 0 | — | 0 | — | 0 | 1 | 1 | 1 | — | — | — | 1 |
| 9 | 1 | 2 | 0 | — | 0 | — | 0 | 0 | 1 | 1 | — | — | — | 1 |
| 10 | 1 | 0 | 1 | 2 | 1 | 0 | 1 | 0 | 1 | 1 | — | — | — | 1 |
| 11 | 1 | 1 | 0 | — | 1 | 1 | 1 | 1 | 1 | 1 | — | — | — | 1 |
| 12 | 1 | 2 | 0 | — | 1 | 2 | 1 | 0 | 1 | 1 | — | — | — | 1 |
| 13 | 1 | 0 | 0 | — | 1 | 0 | 2 | 0 | 1 | 1 | — | — | — | 0 |
| 14 | 1 | 1 | 0 | — | 1 | 1 | 2 | 1 | 1 | 1 | $z_{00}$ | $z_{01}$ | $z_{02}$ | 1 |
| 15 | 1 | 2 | 0 | — | 1 | 2 | 2 | 0 | 1 | 1 | $z_{01}$ | $z_{02}$ | — | 1 |
| 16 | 1 | 0 | 0 | — | 1 | 0 | 3 | 0 | 1 | 1 | $z_{02}$ | — | — | 1 |
| 17 | 1 | 1 | 0 | — | 1 | 1 | 3 | 1 | 1 | 1 | $z_{10}$ | $z_{11}$ | $z_{12}$ | 1 |
| 18 | 1 | 2 | 0 | — | 1 | 2 | 3 | 0 | 1 | 1 | $z_{11}$ | $z_{12}$ | — | 1 |
| 19 | 0 | — | 0 | — | 0 | — | 0 | 0 | 1 | 1 | $z_{12}$ | — | — | 0 |
| 20 | 0 | — | 0 | — | 0 | — | 0 | 0 | 1 | 1 | $z_{20}$ | $z_{21}$ | $z_{22}$ | 1 |
| 21 | 0 | — | 0 | — | 0 | — | 0 | 0 | 1 | 1 | $z_{21}$ | $z_{22}$ | — | 1 |
| 22 | 0 | — | 0 | — | 0 | — | 0 | 0 | 1 | 1 | $z_{22}$ | — | — | 1 |

FIG. 23

| Cycle | rs | rs | rs | is | is | is | 963 | 964 |
|---|---|---|---|---|---|---|---|---|
| 1 | a | – | – | – | – | – | 0 | – |
| 2 | a | a | – | – | – | – | 0 | – |
| 3 | a00 | a10 | a20 | a00 | a10 | a20 | 1 | 0 |
| 4 | a21 | – | – | – | – | – | 0 | – |
| 5 | a11 | a21 | – | – | – | – | 0 | – |
| 6 | a01 | a11 | a21 | a01 | a11 | a21 | 1 | 1 |
| 7 | a22 | – | – | – | – | – | 0 | – |
| 8 | a12 | a22 | – | – | – | – | 0 | – |
| 9 | a02 | a12 | a22 | a02 | a12 | a22 | 1 | 2 |
| 10 | | | | | | | | |
| 11 | | | | | | | | |
| 12 | | | | | | | | |
| 13 | | | | | | | | |
| 14 | | | | | | | | |
| 15 | | | | | | | | |
| 16 | | | | | | | | |
| 17 | | | | | | | | |
| 18 | | | | | | | | |
| 19 | | | | | | | | |
| 20 | | | | | | | | |
| 21 | | | | | | | | |
| 22 | | | | | | | | |
| 23 | | | | | | | | |

| | | | PE11 | | | | PE21 | | | | PE31 | | | | | | | | | | |
|---|---|---|---|---|---|---|---|---|---|---|---|---|---|---|---|---|---|---|---|---|---|---|
| Cycle | ib | rc | 106 | 110 | 01 | rc | 106 | 110 | 02 | rc | 106 | 110 | 03 | 961 | 962 | 973 | 974 | 971 | 972 | 95 | 06 | 931 933 | 94 |
| 1 | x00 | a00 | — | — | — | a10 | — | — | — | a20 | — | — | — | 1 | 0 | 0 | — | 0 | — | 0 | — | 1 1 | 0 |
| 2 | x10 | a01 | a00x00 | — | a00x00 | a11 | a10x00 | — | a10x00 | a21 | a20x00 | — | a20x00 | 1 | 1 | 0 | — | 0 | — | 0 | — | 1 1 | 0 |
| 3 | x20 | a02 | a01x10 | a00x00 | a00x00+ a01x10 | a12 | a11x10 | a10x00 | a10x00+ a11x10 | a22 | a21x10 | a20x00 | a20x00+ a21x10 | 1 | 2 | 0 | — | 0 | — | 0 | — | 1 1 | 0 |
| 4 | x01 | a00 | a02x20 | a00x00+ a01x10 | y00 | a10 | a12x20 | a10x00+ a11x10 | y10 | a20 | a22x20 | a20x00+ a21x10 | y20 | 1 | 0 | 1 | — | 0 | — | 0 | y00 | 1 1 | 0 |
| 5 | x11 | a01 | a00x01 | — | a00x01 | a11 | a10x01 | — | a10x01 | a21 | a20x01 | — | a20x01 | 1 | 1 | 0 | — | 0 | — | 0 | — | 1 1 | 0 |
| 6 | x21 | a02 | a01x11 | a00x01 | a00x01+ a01x11 | a12 | a11x11 | a10x01 | a10x01+ a11x11 | a22 | a21x11 | a20x01 | a20x01+ a21x11 | 1 | 2 | 0 | — | 0 | — | 0 | y01 | 1 1 | 0 |
| 7 | x02 | a00 | a02x21 | a00x01+ a01x11 | y01 | a10 | a12x21 | a10x01+ a11x11 | y11 | a20 | a22x21 | a20x01+ a21x11 | y21 | 1 | 0 | 1 | — | 0 | — | 0 | — | 1 1 | 0 |
| 8 | x12 | a01 | a00x02 | — | a00x02 | a11 | a10x02 | — | a10x02 | a21 | a20x02 | — | a20x02 | 1 | 1 | 0 | — | 0 | — | 0 | y02 | 1 1 | 1 |
| 9 | x22 | a02 | a01x12 | a00x02 | a00x02+ a01x12 | a12 | a11x12 | a10x02 | a10x02+ a11x12 | a22 | a21x12 | a20x02 | a20x02+ a21x12 | 1 | 2 | 1 | — | 1 | 0 | 1 | — | 1 1 | 0 |
| 10 | — | — | a02x22 | a00x02+ a01x12 | y02 | a12 | a12x22 | a10x02+ a11x12 | y12 | a22 | a22x22 | a20x02+ a21x12 | y22 | 0 | — | 0 | 1 | 1 | 1 | 1 | y10 | 1 1 | 0 |
| 11 | | | | | | | | | | | | | | | | | 2 | 1 | 2 | 1 | y11 | 1 1 | 0 |
| 12 | | | | | | | | | | | | | | | | | 0 | 1 | 0 | 2 | y12 | 1 1 | 0 |
| 13 | | | | | | EXECUTE THE NEXT BLOCK | | | | | | | | | | | 1 | 1 | 1 | 2 | y20 | 1 1 | 0 |
| 14 | | | | | | | | | | | | | | | | | 2 | 1 | 2 | 2 | y21 | 1 1 | 0 |
| 15 | | | | | | | | | | | | | | | | | 0 | 1 | 0 | 3 | — | 1 1 | 0 |
| 16 | | | | | | | | | | | | | | | | | 1 | 1 | 1 | 3 | — | 1 1 | 0 |
| 17 | | | | | | | | | | | | | | | | | 2 | 1 | 2 | 3 | y22 | 1 1 | 0 |

FIG. 28

| Cycle | ob | rc | 106 | 110 | 01 | rc | 106 | 110 | 02 | rc | 106 | 110 | 03 | 961 | 962 | 931 | 94 | 933 | ro1 | ro2 | ro3 | 12 |
|---|---|---|---|---|---|---|---|---|---|---|---|---|---|---|---|---|---|---|---|---|---|---|
| 1 | — | — | — | — | — | — | — | — | — | — | — | — | — | — | — | — | — | — | — | — | — | — |
| 2 | — | — | — | — | — | — | — | — | — | — | — | — | — | — | — | — | — | — | — | — | — | — |
| 3 | — | — | — | — | — | — | — | — | — | — | — | — | — | — | — | — | — | — | — | — | — | — |
| 4 | — | — | — | — | — | — | — | — | — | — | — | — | — | — | — | — | — | — | — | — | — | — |
| 5 | — | — | — | — | — | — | — | — | — | — | — | — | — | — | — | — | — | — | — | — | — | — |
| 6 | — | — | — | — | — | — | — | — | — | — | — | — | — | — | — | — | — | — | — | — | — | — |
| 7 | — | — | — | — | — | — | — | — | — | — | — | — | — | — | — | — | — | — | — | — | — | — |
| 8 | — | — | — | — | — | — | — | — | — | a20 | — | — | — | 1 | — | — | — | 1 | — | — | — | 1 |
| 9 | y00 | a00 | — | — | — | a10 | — | — | — | a21 | — | — | — | 1 | 0 | 1 | 0 | 1 | — | — | — | 1 |
| 10 | y01 | a01 | a00y00 | — | a00y00 | a11 | a10y00 | — | a10y00 | a22 | a20y00 | — | a20y00 | 1 | 1 | 1 | 1 | 1 | — | — | — | 1 |
| 11 | y02 | a02 | a01y01 | a00y00+a01y01 | a00y00+a01y01 | a12 | a11y01 | a10y00+a11y01 | a10y00+a11y01 | a20 | a21y01 | a20y00+a21y01 | a20y00+a21y01 | 1 | 2 | 1 | 0 | 1 | — | — | — | 0 |
| 12 | y10 | a00 | a02y02 | a00y00+a01y01 | (Z00) | a10 | a12y02 | a10y00+a11y01 | (Z01) | a21 | a22y02 | a20y00+a21y01 | (Z02) | 1 | 0 | 1 | 1 | 1 | Z00 | — | — | 1 |
| 13 | y11 | a01 | a00y10 | — | a00y10 | a11 | a10y10 | — | a10y10 | a22 | a20y10 | — | a20y10 | 1 | 1 | 1 | 0 | 1 | Z01 | Z02 | — | 1 |
| 14 | y12 | a02 | a01y11 | a00y10+a01y11 | a00y10+a01y11 | a12 | a11y11 | a10y10+a11y11 | a10y10+a11y11 | a20 | a21y11 | a20y10+a21y11 | a20y10+a21y11 | 1 | 2 | 1 | 0 | 1 | — | — | — | 0 |
| 15 | y20 | a00 | a02y12 | a00y10+a01y11 | (Z10) | a10 | a12y12 | a10y10+a11y11 | (Z11) | a21 | a22y12 | a20y10+a21y11 | (Z12) | 1 | 0 | 1 | 1 | 1 | Z10 | Z11 | Z12 | 1 |
| 16 | y21 | a01 | a00y20 | — | a00y20 | a11 | a10y20 | — | a10y20 | a22 | a20y20 | — | a20y20 | 1 | 0 | 1 | 0 | 1 | Z12 | — | — | 0 |
| 17 | y22 | a02 | a01y21 | a00y20+a01y21 | a00y20+a01y21 | a12 | a11y21 | a10y20+a11y21 | a10y20+a11y21 | — | a21y21 | a20y20+a21y21 | a20y20+a21y21 | 0 | 0 | 1 | 0 | 1 | — | — | — | 1 |
| 18 | — | — | a02y22 | a00y20+a01y21 | (Z20) | — | a12y22 | a10y20+a11y21 | (Z21) | — | a22y22 | a20y20+a21y21 | (Z22) | 0 | 0 | 1 | 0 | 1 | Z20 | Z21 | Z22 | 1 |
| 19 | — | — | — | — | — | — | — | — | — | — | — | — | — | 0 | 0 | 1 | 0 | 1 | Z21 | Z22 | — | 1 |
| 20 | — | — | — | — | — | — | — | — | — | — | — | — | — | 0 | 0 | 1 | 0 | 1 | Z22 | — | — | 1 |
| 21 | — | — | — | — | — | — | — | — | — | — | — | — | — | 0 | 0 | 1 | 0 | 1 | — | — | — | 1 |

| Cycle | rs21 | rs22 | rs23 | rs11 | rs12 | rs13 | is1 | is2 | is3 | ib1 | ib2 | ib3 | PE11 107 | PE11 110 | PE21 107 | PE21 110 | PE31 107 | PE31 110 | PE12 107 | PE12 110 |
|---|---|---|---|---|---|---|---|---|---|---|---|---|---|---|---|---|---|---|---|---|
| 1 | y00 | — | — | — | — | — | — | — | — | — | — | — | — | — | — | — | — | — | — | — |
| 2 | y10 | y00 | — | — | — | — | — | — | — | — | — | — | — | — | — | — | — | — | — | — |
| 3 | y20 | y10 | y00 | — | — | — | y20 | y10 | y00 | x00 | — | — | — | — | — | — | — | — | — | — |
| 4 | y01 | — | — | y30 | y20 | y10 | y30 | y20 | y10 | x10 | — | — | \|x00-y20\| | — | \|x00-y10\| | — | \|x00-y20\| | — | — | — |
| 5 | y11 | y01 | — | y40 | y30 | y20 | y40 | y30 | y20 | x20 | — | — | \|x10-y30\| | \|x00-y20\| | \|x10-y20\| | \|x00 y10\| | \|x10-y10\| | \|x00-y20\| | — | — |
| 6 | y21 | y11 | y01 | — | — | — | y21 | y11 | y01 | x01 | x00 | — | \|x20-y40\| | rA+\|x10-y30\| | \|x20-y30\| | rA+\|x10 y20\| | \|x20-y20\| | rA+\|x10-y00\| | — | — |
| 7 | y02 | — | — | y31 | y21 | y11 | y31 | y21 | y11 | x11 | x10 | — | \|x01-y21\| | rA+\|x20-y40\| | \|x01-y11\| | rA+\|x20 y30\| | \|x01-y01\| | rA+\|x20-y20\| | \|x00-y21\| | — |
| 8 | y12 | y02 | — | y41 | y31 | y21 | y41 | y31 | y21 | x21 | x20 | — | \|x11-y31\| | rA+\|x01-y21\| | \|x11-y21\| | rA+\|x01 y11\| | \|x11-y11\| | rA+\|x01-y01\| | \|x10-y31\| | \|x00-y21\| |
| 9 | y22 | y12 | y02 | — | — | — | y22 | y12 | y02 | x02 | x01 | x00 | \|x21-y41\| | rA+\|x11-y31\| | \|x21-y31\| | rA+\|x11 y21\| | \|x21-y21\| | rA+\|x11-y11\| | \|x20-y41\| | \|x10-y31\| |
| 10 | y03 | — | — | y32 | y22 | y12 | y32 | y22 | y12 | x12 | x11 | x10 | \|x02-y22\| | rA+\|x21-y41\| | \|x02-y12\| | rA+\|x21 y31\| | \|x02-y02\| | rA+\|x21-y21\| | \|x01-y22\| | \|x20-y\| |
| 11 | y13 | y03 | — | y42 | y32 | y22 | y42 | y32 | y22 | x22 | x21 | x20 | \|x12-y32\| | rA+\|x02-y22\| | \|x12-y22\| | rA+\|x02 y12\| | \|x12-y12\| | rA+\|x02-y02\| | \|x11-y32\| | \|x01-y22\| |
| 12 | y23 | y13 | y03 | — | — | — | y23 | y13 | y03 | — | x02 | x01 | \|x22-y42\| | rA+\|x12-y32\| | \|x22-y32\| | rA+\|x12 y22\| | \|x22-y22\| | rA+\|x12-y12\| | \|x21-y42\| | \|x11-y32\| |
| 13 | y04 | — | — | y33 | y23 | y13 | y33 | y23 | y13 | — | x12 | x11 | — | z20 | — | z10 | — | z00 | \|x02-y23\| | \|x21-y42\| |
| 14 | y14 | y04 | — | y43 | y33 | y23 | y43 | y33 | y23 | — | x22 | x21 | — | — | — | — | — | — | \|x12-y33\| | \|x02-y23\| |
| 15 | y24 | y14 | y04 | — | — | — | y24 | y14 | y04 | — | — | x02 | — | — | — | — | — | — | \|x22-y43\| | \|x12-y33\| |
| 16 | — | — | — | y34 | y24 | y14 | y34 | y24 | y14 | — | — | x12 | — | — | — | — | — | — | — | z21 |
| 17 | — | — | — | y44 | y34 | y24 | y44 | y34 | y24 | — | — | x22 | — | — | — | — | — | — | — | — |
| 18 | — | — | — | — | — | — | — | — | — | — | — | — | — | — | — | — | — | — | — | — |
| 19 |  |  |  |  |  |  |  |  |  |  |  | — |  |  |  |  |  |  |  |  |
| 20 |  |  |  |  |  |  |  |  |  |  |  | — |  |  |  |  |  |  |  |  |
| 21 |  |  |  |  |  |  |  |  |  |  |  | — |  |  |  |  |  |  |  |  |
| 22 |  |  |  |  |  |  |  |  |  |  |  | — |  |  |  |  |  |  |  |  |

FIG. 31A

| | PE22 | | PE32 | | PE13 | | PE23 | | PE33 | | | | |
|---|---|---|---|---|---|---|---|---|---|---|---|---|---|
| Cycle | 107 | 110 | 107 | 110 | 107 | 110 | 107 | 110 | 107 | 110 | ro11 | ro12 | ro13 |
| 1 | — | — | — | — | — | — | — | — | — | — | — | — | — |
| 2 | — | — | — | — | — | — | — | — | — | — | — | — | — |
| 3 | — | — | — | — | — | — | — | — | — | — | — | — | — |
| 4 | — | — | — | — | — | — | — | — | — | — | — | — | — |
| 5 | — | — | — | — | — | — | — | — | — | — | — | — | — |
| 6 | — | — | — | — | — | — | — | — | — | — | — | — | — |
| 7 | \|x00-y11\| | — | \|x00-y01\| | — | — | — | — | — | — | — | — | — | — |
| 8 | \|x10-y21\| | \|x00-y11\| | \|x10-y11\| | \|x00-y01\| | — | — | — | — | — | — | — | — | — |
| 9 | \|x20-y31\| | rA+ \|x10-y21\| | \|x20-y21\| | rA+ \|x10-y11\| | — | — | — | — | — | — | — | — | — |
| 10 | \|x01-y12\| | rA+ \|x20-y31\| | \|x01-y02\| | rA+ \|x20-y21\| | \|x00-y22\| | — | \|x00-y12\| | — | \|x00-y02\| | — | — | — | — |
| 11 | \|x11-y22\| | rA+ \|x01-y12\| | \|x11-y12\| | rA+ \|x01-y02\| | \|x10-y32\| | \|x00-y22\| | \|x10-y22\| | rA+ \|x00-y12\| | \|x10-y12\| | \|x00-y02\| | — | — | — |
| 12 | \|x21-y32\| | rA+ \|x11-y22\| | \|x21-y22\| | rA+ \|x11-y22\| | \|x20-y42\| | rA+ \|x10-y32\| | \|x20-y32\| | rA+ \|x10-y22\| | \|x20-y22\| | rA+ \|x10-y12\| | — | — | — |
| 13 | \|x02-y03\| | rA+ \|x21-y32\| | \|x02-y03\| | rA+ \|x21-y22\| | \|x01-y23\| | rA+ \|x20-y42\| | \|x01-y13\| | rA+ \|x20-y32\| | \|x01-y03\| | rA+ \|x20-y22\| | z-20 | — | — |
| 14 | \|x12-y13\| | rA \|x02-y03\| | \|x12-y13\| | \|x02-y03\| | \|x11-y33\| | rA + \|x01-y23\| | \|x11-y23\| | rA+ \|x01-y13\| | \|x11-y13\| | rA+ \|x01-y03\| | z-10 | — | — |
| 15 | \|x22-y33\| | rA+ \|x12-y13\| | \|x22-y23\| | rA+ \|x12-y13\| | \|x21-y43\| | rA+ \|x11-y33\| | \|x21-y33\| | rA+ \|x11-y23\| | \|x21-y23\| | rA+ \|x11-y13\| | z-00 | — | — |
| 16 | — | z-21 | — | z-01 | \|x02-y24\| | rA+ \|x21-y43\| | \|x02-y14\| | rA+ \|x21-y33\| | \|x02-y04\| | rA+ \|x21-y23\| | — | z-21 | — |
| 17 | — | — | — | — | \|x12-y34\| | rA+ \|x02-y24\| | \|x12-y24\| | rA+ \|x02-y14\| | \|x12-y14\| | rA+ \|x02-y04\| | — | z-11 | — |
| 18 | — | — | — | — | \|x22-y44\| | rA+ \|x12-y34\| | \|x22-y34\| | rA+ \|x12-y24\| | \|x22-y24\| | rA+ \|x12-y14\| | — | z-01 | — |
| 19 | — | — | — | — | — | z-22 | — | z-12 | — | z-02 | — | — | z-22 |
| 20 | — | — | — | — | — | — | — | — | — | — | — | — | z-12 |
| 21 | — | — | — | — | — | — | — | — | — | — | — | — | z-02 |
| 22 | — | — | — | — | — | — | — | — | — | — | | | |

FIG. 31B

| Cycle | 6 | | 941 | 121 | 942 | 122 | 943 | 123 | | CI1 | CI2 | CI3 | | |
|---|---|---|---|---|---|---|---|---|---|---|---|---|---|---|
| 1 | 1 | | 0 | 1 | 0 | 1 | 0 | 1 | | 0 | 0 | 0 | | |
| 2 | 1 | | 0 | 1 | 0 | 1 | 0 | 1 | | 0 | 0 | 0 | | |
| 3 | 0 | | 0 | 1 | 0 | 1 | 0 | 1 | | 0 | 0 | 0 | | |
| 4 | 1 | | 1 | 1 | 0 | 1 | 0 | 1 | | 0 | 0 | 0 | | |
| 5 | 1 | | 0 | 1 | 0 | 1 | 0 | 1 | | 0 | 0 | 0 | | |
| 6 | 0 | | 0 | 1 | 0 | 1 | 0 | 1 | | 0 | 0 | 0 | | |
| 7 | 1 | | 0 | 1 | 0 | 1 | 0 | 1 | | 0 | 0 | 0 | | |
| 8 | 1 | | 0 | 1 | 0 | 1 | 0 | 1 | | 0 | 0 | 0 | | |
| 9 | 0 | | 0 | 1 | 0 | 1 | 0 | 1 | | 0 | 0 | 0 | | |
| 10 | 1 | | 0 | 1 | 0 | 1 | 1 | 1 | | 0 | 0 | 0 | | |
| 11 | 1 | | 0 | 1 | 0 | 1 | 0 | 1 | | 0 | 0 | 0 | | |
| 12 | 0 | | 0 | 0 | 0 | 1 | 0 | 1 | | 0 | 0 | 0 | | |
| 13 | 1 | | 0 | 1 | 0 | 1 | 0 | 1 | | 1 | 0 | 0 | | |
| 14 | 1 | | 0 | 1 | 0 | 1 | 0 | 1 | | 1 | 0 | 0 | | |
| 15 | 0 | | 0 | 1 | 0 | 0 | 0 | 1 | | 1 | 0 | 0 | | |
| 16 | 1 | | 0 | 1 | 0 | 1 | 0 | 1 | | 0 | 1 | 0 | | |
| 17 | 1 | | 0 | 1 | 0 | 1 | 0 | 1 | | 0 | 1 | 0 | | |
| 18 | 1 | | 0 | 1 | 0 | 1 | 0 | 0 | | 0 | 1 | 0 | | |
| 19 | 1 | | 0 | 1 | 0 | 1 | 0 | 1 | | 0 | 0 | 1 | | |
| 20 | 1 | | 0 | 1 | 0 | 1 | 0 | 1 | | 0 | 0 | 1 | | |
| 21 | 1 | | 0 | 1 | 0 | 1 | 0 | 1 | | 0 | 0 | 1 | | |
| 22 | 1 | | 0 | 1 | 0 | 1 | 0 | 1 | | 0 | 0 | 0 | | |
| 23 | | | | | | | | | | | | | | |

FIG. 32

PIPELINED SIMD-SYSTOLIC ARRAY PROCESSOR AND METHODS THEREOF

BACKGROUND OF THE INVENTION

The present invention relates to a pipelined SIMD-Systolic array processor and its methods. Especially, the present invention uses a way which combines both the broadcasting and the systolic structures to connect multiple pipelined processing elements together. Totally, the present invention accomplishes the design of an array processing architecture, which can process multiple data stream with single instruction stream, and its related computing methods. Moreover, the present invention can be applied to the design of parallel computers, video image processors, and digital signal processors. Meanwhile, the present invention can manipulate data transferring and shifting more efficiently, and also can be implemented on single VLSI chip. Thus, the present invention is full of practicability.

SUMMARY OF THE INVENTION

It is the primary object of the present invention, to provide a way for data input/output, data shifting, and data transferring. Thus, data processing can be faster and more efficiently.

Through efficient manipulation of data input/output, the present invention can save data lines and VLSI chip's pin-count. Moreover, the present invention avoids using complex control and uses the memory in an efficient manner. Thus, the present invention can be implemented on single VLSI chip. This is the secondary object of the present invention.

It is another object of the present invention to be designed as one-dimensional or two-dimensional array processor.

It is a further object of the present invention to be implemented on a VLSI chip and able to be installed directly on computers or televisions to accomplish various image processing functions. This means that the present invention is of practicability, of convenience, and of small size.

To achieve the previously described objects, the present invention mainly comprises registers, multiplexers and a number of processing elements, constructed as an array processing architecture. In the front and rear input/output ports, each processing element is also connected to registers and multiplexers. By cascading these registers and multiplexers together, the present invention can update the input data to each processing element by shifting. Therefore, reusable datum are not necessary to be reloaded every cycle from the multi-port memory. This can save the data loading time and the number of data lines, and, make the present invention easier to be implemented on a VLSI chip.

BRIEF DESCRIPTION OF THE DRAWINGS

FIG. 3 is the input/output truth table for the mode-control ROM of the processing elements of the present invention.

FIG. 11 is a cycle-based data and control signal diagram of the present invention for loading constant data into the processing elements during processing matrix multiplication computation.

FIGS. 12A & 12B are cycle-based data and control signal diagram of the present invention for processing matrix computation.

FIG. 14 is a cycle-based data and control signal diagram of the present invention for processing finite-impulse-response filtering computation.

FIG. 16 is a cycle-based data and control signal diagram of the present invention for processing infinite-impulse-response filtering computation.

FIGS. 18A, 18B & 19 represent cycle-based data and control signal diagrams of the present invention for processing edge-detection and smoothing computation.

FIG. 21 is a cycle-based data signal diagram of the present invention for loading constant data into the processing elements during processing two-dimensional discrete cosine transform.

FIGS. 22 & 23 represent a cycle-based data and control signal diagram of the present invention for processing the two-dimensional discrete cosine transform.

FIG. 26 is a cycle-based data and control signal diagram of the present invention for loading constant data into the processing elements of the two-dimensional array architecture shown as FIG. 25 for processing the two-dimensional discrete cosine transform.

FIGS. 27 & 28 represent cycle-based data and control signal diagrams of the present invention for processing the two-dimensional discrete cosine transform by the two-dimensional array architecture shown as FIG. 25.

FIGS. 31A, 31B & 32 represent cycle-based data and control signal diagrams of the present invention for processing image template matching and motion estimation by the two-dimensional array architecture shown as FIG. 30.

DETAILED DESCRIPTION OF THE PREFERRED EMBODIMENT

Figure 1:
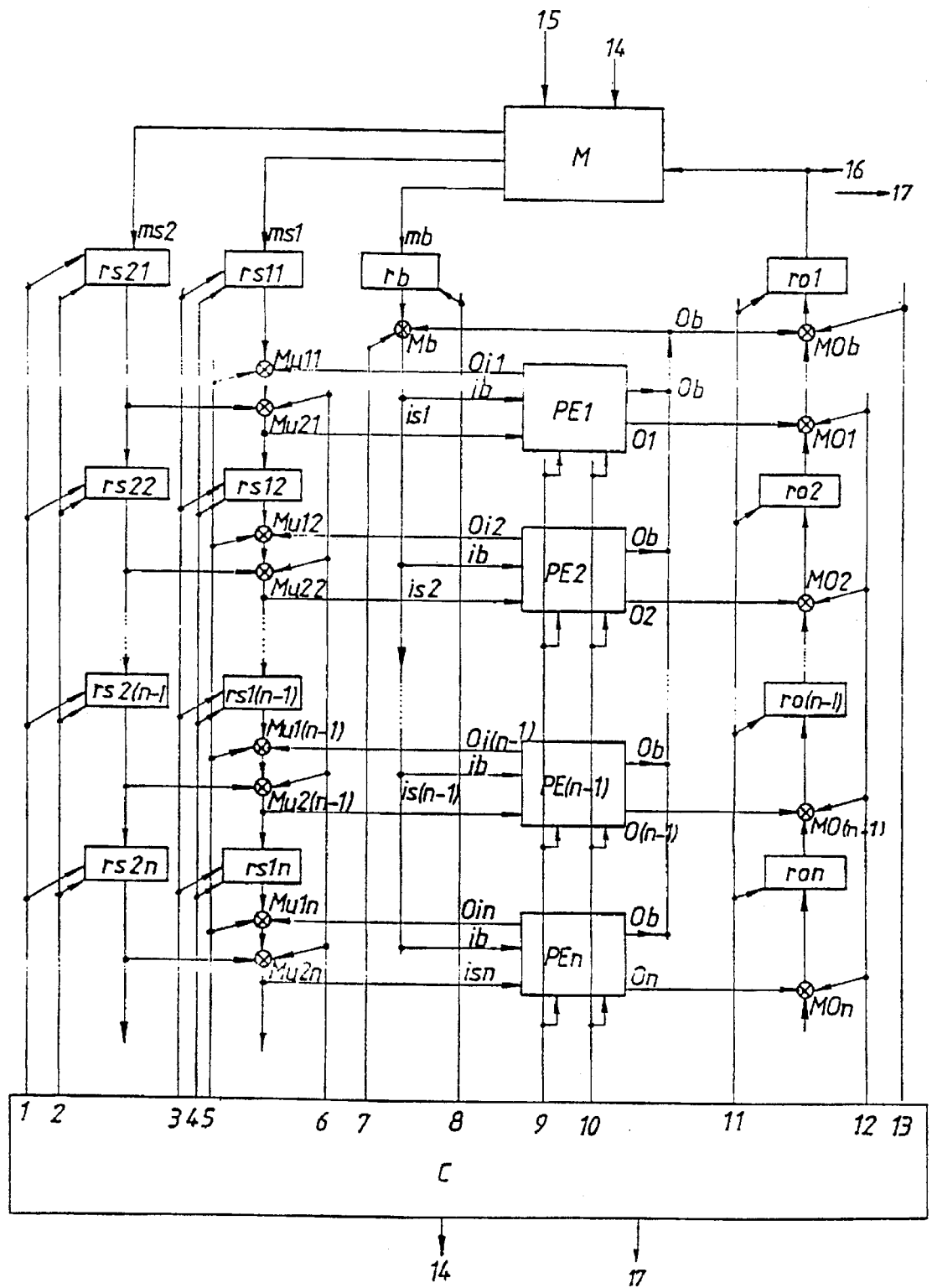
FIG. 1 is a schematic block diagram for the pipelined SIMD-Systolic array processing architecture of the present invention.

As shown in FIG. 1, the present invention mainly comprises a number of processing elements PE1~PEn, which constructed as an array (processing) architecture, a broadcasting register rb, shift register arrays rs11~rs1n, rs21~rs2n, ro1~ron, multiplexers Mu11~Mu1n, Mu21~Mu2n, Mb, MO1~MOn, MOb, a multiport memory M, and a controller C. At the input ports the processing elements PE1~PEn are connected to the registers rs11~rs2n, rs21~rs2n, rb through the multiplexers Mu11~Mu1n, Mu21~Mu2n, Mb.

At the output ports the processing elements PE1~PEn are connected to the registers ro1~ron through the multiplexers MO1~MOn, MOb. Moreover, the multiport memory M is connected to the registers rs21, rs11, rb, ro1. Then, all of the components of the present invention are controlled by the controller C. The control signals sent out from the controller C are presented as follows:

Control signal 1: the shift/load control signal for the shift register array rs21~rs2n.

Control signal 2: the clear control signal for the shift register array rs21~rs2n.

Control signal 3: the shift/load control signal for the shift register array rs11~rs1n.

Control signal 4: the clear control signal for the shift register array rs11~rs1n.

Control signal 5: the data-select control signal for multiplexers Mu11~Mu1n.

Control signal 6: the data-select control signal for multiplexers Mu21~Mu2n.

Control signal 7: the data-select control signal for the multiplexer Mb to select broadcasting data.

Control signal 8: the load control signal for the broadcasting register rb.

Control signal 9: the function control signals for the processing elements PE1~PEn.

Control signal 10: the reset control signal for the processing elements PE1~PEn.

Control signal 11: the shift/load control signal for the shift register array ro1~ron.

Control signal 12: the data-select control signal for the multiplexers MO1~MOn.

Control signal 13: the data-select control signal for the multiplexer MOb.

Control signal 14: Control signals for the multiport memory which include addresses, Read/Write, Enable, etc.

Data and Control signal 15: data and control signals from an external processor to the multiport memory.

Data signal 16: data signals to other external functional unit.

Control signal 17: control signals to other external function unit.

According to the data processing operations of the present invention, input datum are transferred to the processing elements PE1~PEn for processing under the control of control signals 1~8. The action of these control signals is described in the following.

If the control signal 2 is of logic one, the content of registers rs21~rs2n would be cleared as logic zero;

if the control signal 1 is of logic one, register rs2n would be loaded with the content of register rs2(n−1), where n>1, and register rs21 would be loaded with the value of ms2 which is read from the multiport memory M;

if the control signal 4 is of logic one, the content of registers rs11~rs1n would be cleared as logic zero;

if the control signal 3 is of logic one, register rs1n would be loaded with the value of is(n−1), where n>1, and register rs11 would be loaded with the value of ms1 which is read from the multiport memory M. Multiplexers Mu11~Mu1n are controlled by control signal 5 and multiplexers Mu21~Mu2n are controlled by control signal 6. These multiplexers are used to generate isn from rs2n, rs1n, Oin in the following way.

If the control signal 6 is of logic zero, isn is equal to the content of rs2n;

if the control signal 6 is of logic one and the control signal 5 is of logic one, isn is equal to the content of rs1n;

if the control signal 6 is of logic one and the control signal 5 is of logic zero, isn is equal to the content of Oin.

Additionally, the control signal 8 is to control the loading of broadcasting register rb with Mb which is read from the multiport memory M. If the control signal 8 is of logic one, register rb would be loaded with Mb. Control signal 7 is to control the multiplexer Mb to generate the broadcasting data to the processing elements PE1~PEn from rb and Ob, where Ob is the broadcasting output data from the processing elements PE1~PEn.

If the control signal 7 is of logic one, the broadcasting data signal ib is equal to the content of register rb; if the control signal 7 is of logic zero, the broadcasting data signal ib is equal to Ob. The output control of the present invention is through the control of control signals 11~13. The control method is similar to what has been described for the input control. If the control signal 11 is of logic one, registers ron, where n>1, is loaded with the data from multiplexers MOn and register rob is loaded with the data from MOb and MO1. If both the control signals 12 and 13 are of logic one, registers ron would be loaded with ro(n+1); if the control signal 12 is of logic zero and the control signal 13 is of logic one, registers ron would be loaded with On; if the control signal 13 is of logic zero, register ro1 would be loaded with Ob.

Finally, control signal 14 is for the control of multiport memory M to read and write data.

Figure 2:
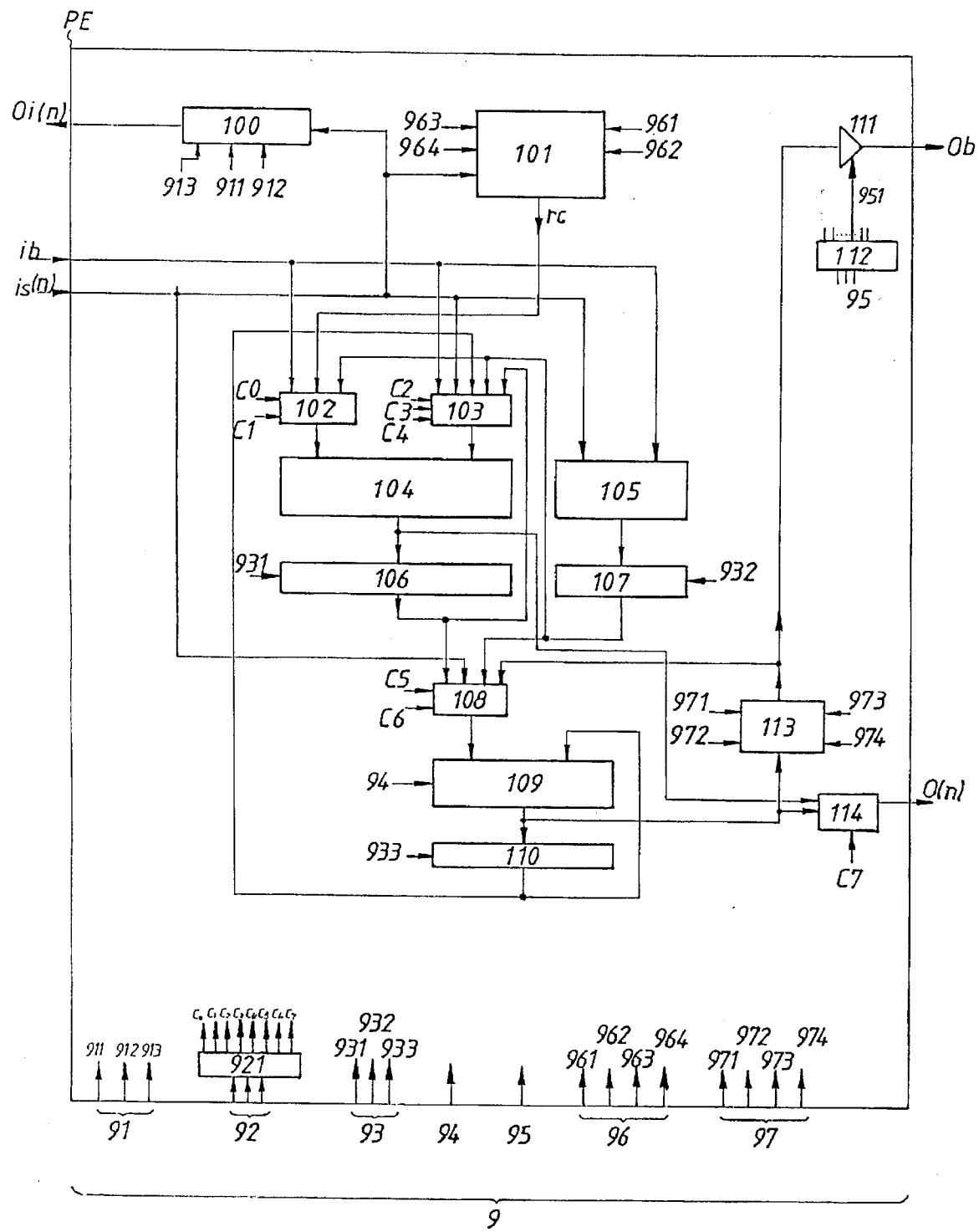
FIG 2 is a schematic circuit diagram for the processing elements of the present invention.
Figure 6:
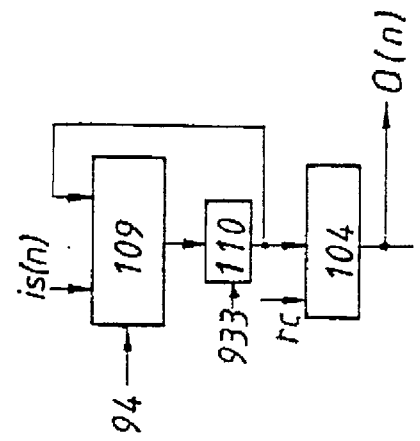
FIG. 6 is the third operational mode for the processing elements of the present invention.
Figure 5:
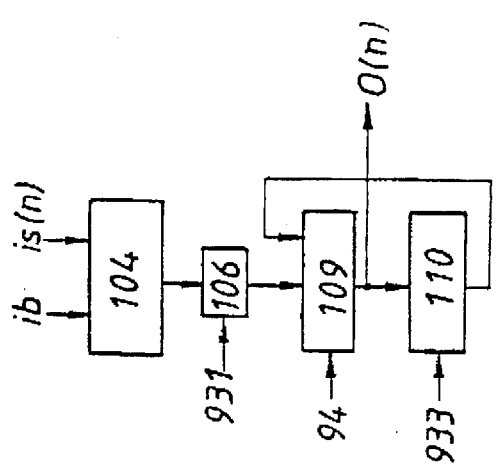
FIG. 5 is the second operational mode for the processing elements of the present invention.
Figure 4:
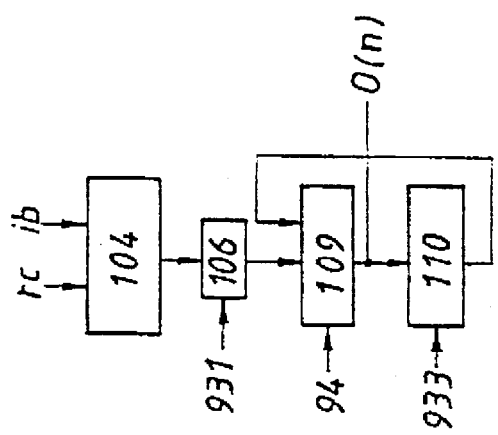
FIG. 4 is the first operational mode for the processing elements of the present invention.
Figure 9:
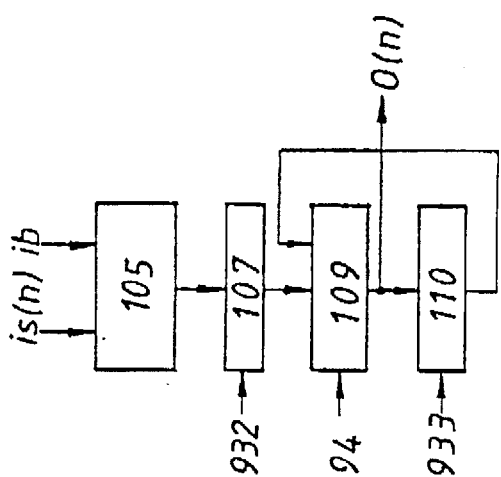
FIG. 9 is the sixth operational mode for the processing elements of the present invention.
Figure 8:
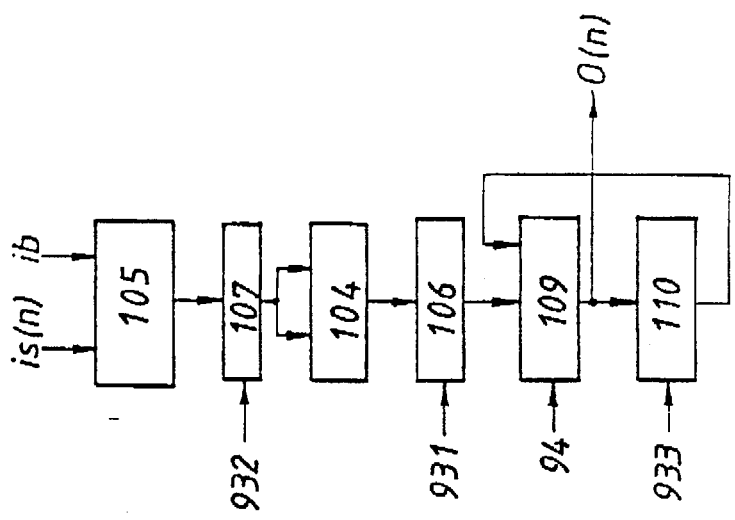
FIG. 8 is the fifth operational mode for the processing elements of the present invention.
Figure 7:
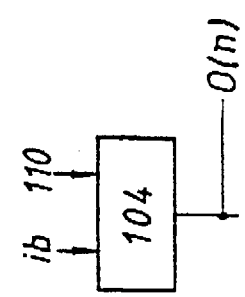
FIG. 7 is the fourth operational mode for the processing elements of the present invention.

As shown in FIG. 2, the pipelined processing element, PE, of the present invention comprises first-in first-out memory 100, constant register file 101, multiplexers 102, 103, 108 and 114, registers 106, 107 and 110, multiplier 104, absolute-difference unit 105, adder 109, data register file 113, tristate buffer 111, and decoder 112. Meanwhile, control signal 9 from the controller C are for the function control of the processing element and can be further divided into the following subgroups first-in first-out memory control 91, operational mode control 92, register-load control 93, adder control 94, identification control 95, constant register file control 96, data register file control 97.

For operational mode control, there is a read-only memory 921 to generate the control signals C0~C7 from the mode control 92.

As shown in FIG. 3, there are six operational modes for running the processing element.

Referring to FIG. 2, C0, C1 are to control the multiplexer 102; C2, C3, C4 are to control the multiplexer 103; C5, C6 are to control the multiplexer 108; C7 is to control the multiplexer 114. Thus, by using mode control 92, the processing element can change the operational mode. Totally, through controlling the internal data flow paths, each processing element of the present invention can have six operational modes. FIGS. 4, 5, 6, 7, 8, 9 show the schematic block diagrams for each operational mode respectively. With these operational modes, the array processing architecture of the present invention can manipulate various operations more efficiently.

Figure 10:
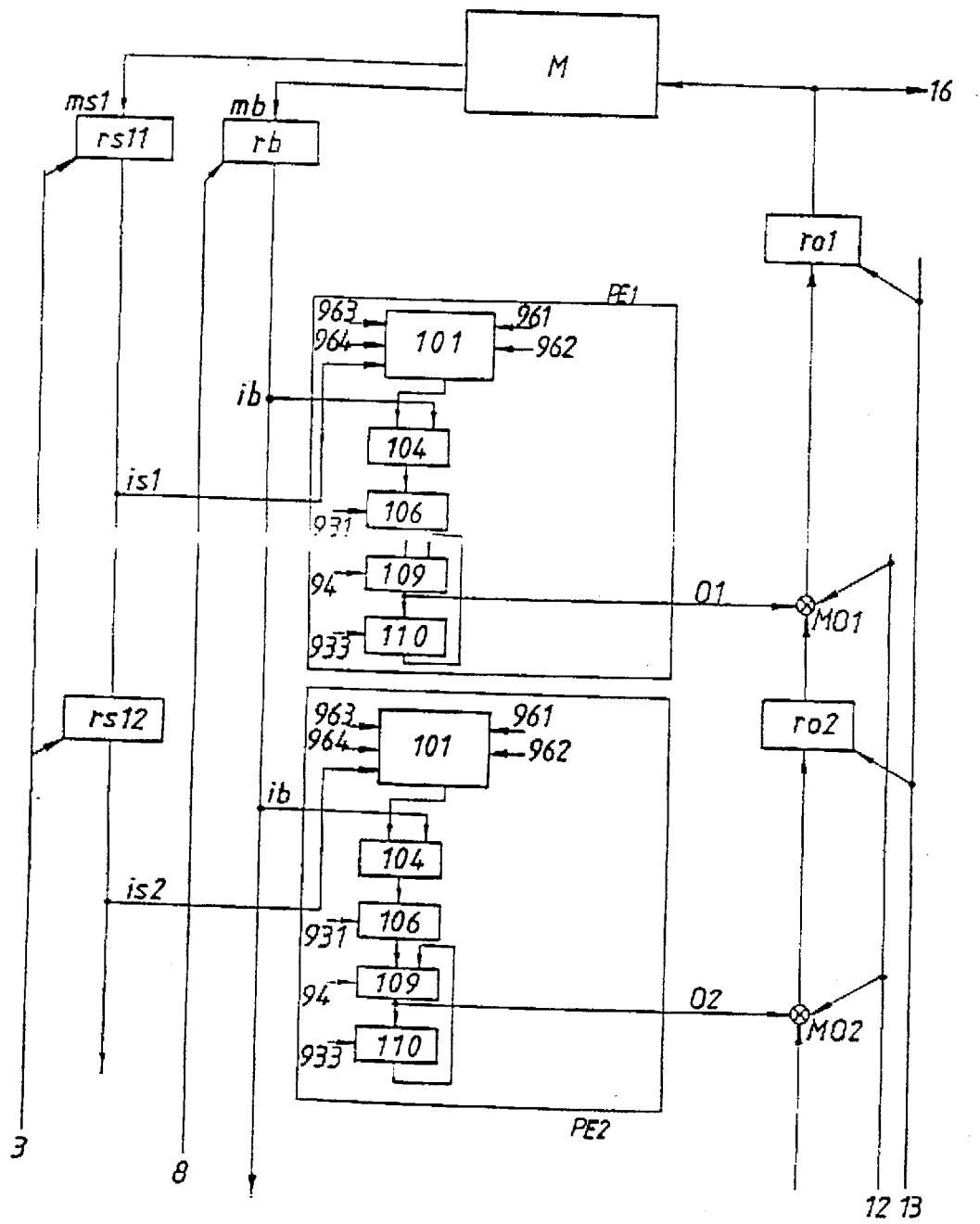
FIG. 10 is a schematic circuit diagram of the present invention for processing matrix multiplication computation.

As for the other control signals, their functions are explained as follows:

911: the read control signal for the first-in first-out memory 100;

912: the write control signal for the first-in first-out memory 100;

913: the reset control signal for the first-in first-out memory 100;

931: the load control signal for the register 106;

932: the load control signal for the register 107;

933: the load control signal for the register 110;

94: the function control signal for the adder 109;

95: the identification control for the processing element and the input of the decoder 112;

951: the switch control of the tristate buffer 111;

961: the read control signal for the constant register file 101;

962: addresses for read operation for the constant register file 101;

963: the write control signal for the constant register file 101;

964: addresses for write operation for the constant register file 101;

971: the read control signal for the data register file 113;

972: addresses for read operation for the data register file 113;

973: the write control signal for the data register file 113;

974: addresses for write operation for the data register file 113;

As shown in FIG. 10, the array processing architecture is the embodiment of the present invention for processing the matrix computation. For explanation, only two processing elements are included. During processing the matrix computation, the processing elements of the present invention are all in the first operational mode, shown as FIG. 4, through the control of controller C. Also, control signals 5, 6, 7, 13 are all in the state of logic one. Thus, multiplexers Mu11~Mu1n, Mu21~Mu2n, Mb, MOb are in the data transferring state as shown in FIG. 10. Here the following matrix computation is used as an example for explaining how the present invention can process the matrix computation.

$$\begin{bmatrix} a00 & a01 & a02 & a03 \\ a10 & a11 & a12 & a13 \\ a20 & a21 & a22 & a23 \\ a30 & a31 & a32 & a33 \end{bmatrix} \cdot \begin{bmatrix} x00 & x01 \\ x10 & x11 \\ x20 & x21 \\ x30 & x31 \end{bmatrix} = \begin{bmatrix} y00 & y01 \\ y10 & y11 \\ y20 & y21 \\ y30 & y31 \end{bmatrix}$$

In order to process the matrix computation shown above, first of all, the present invention loads the processing element PE1 with constant data a00, a01, a02, a03, a20, a21, a22, a23 and loads the processing element PE2 with constant data a10, a11, a12, a13, a30, a31, a32, a33. Referring to FIG. 11, the constant data are loaded into the processing elements through registers rs11, rs12, and, the loading operation is controlled by control signals 3, 963, 964. The control signal 3 is always in the state of logic one. Therefore, registers rs11, rs12 can shift and load data from the multiport memory M to the processing elements. In the first cycle, load data a10 into register rs11. In the next cycle, load data a00 into register rs11 and data a10 would propagate to register rs12. Then, when data a11 is coming, data a00, a10 which are now stored in registers rs11 and rs12 respectively would be transferred into processing elements PE1 and PE2 individually. AT this time, the write control signal 963 for the contant register file 101 would be in the state of logic one. Continuously doing in this way, the processing element PE1 would eventually be loaded with data a00, a01, a02, a03, a20, a21, a22, a23, and, the processing element PE2 loaded with data a10, a11, a12, a13, a30, a31, a32, a33.

Figure 12A:
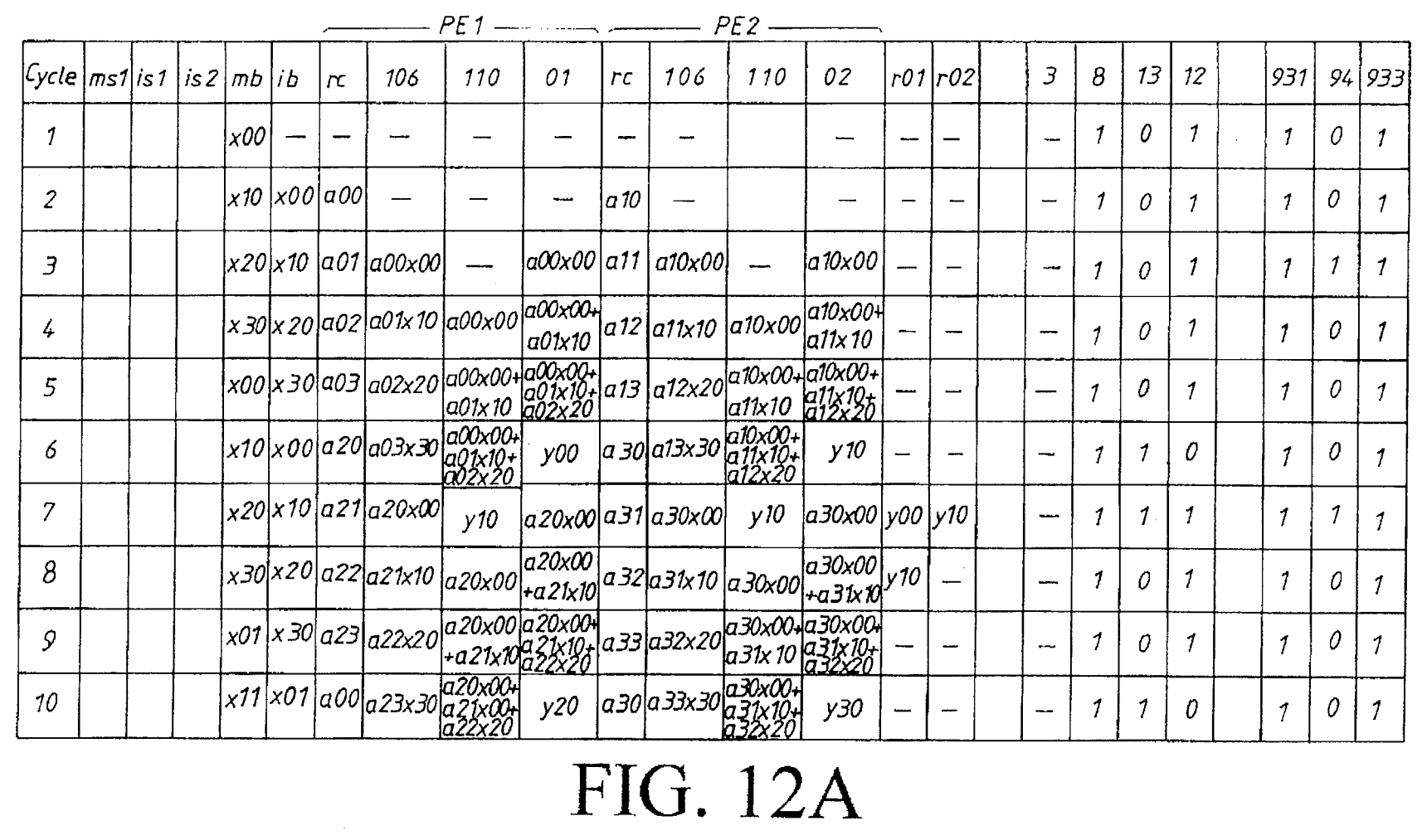
Figure 12B:
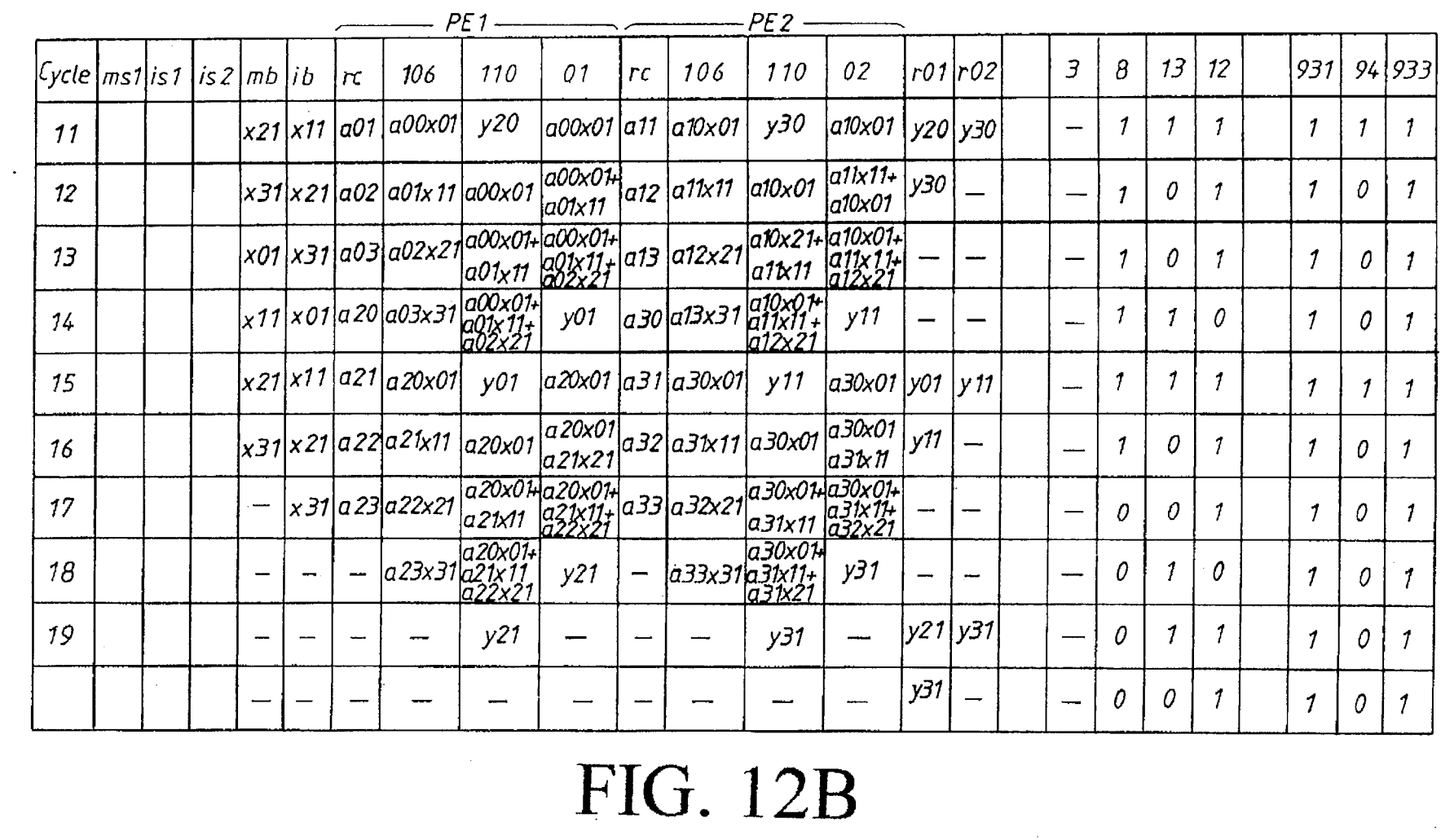

As to the processing of matrix computation, FIGS. 12A and 12B show the internal operation of the processing elements PE1, PE2 and the broadcasting register rb cycle by cycle during the computation.

According to the matrix computation shown above, the computational results are as follows:

y00=a00 x00+a01 x10+a02 x20+a03 x30
y10=a10 x00+a11 x10+a12 x20+a13 x30
y20=a20 x00+a21 x10+a22 x20+a23 x30
y30=a30 x00+a31 x10+a32 x20+a33 x30
y01=a00 x01+a01 x11+a02 x21+a03 x31
y11=a1O xO1+a11 x11+a12 x21+a13 x31
y21=a20 x01+a21 x11+a22 x21+a23 x31
y31=a30 x01+a31 x11+a32 x21+a33 x31

The data [aij]have been preloaded into the processing elements PE1, PE2. Therefore, during processing the matrix computation, data x00 is first transferred into register rb from the memory M. Meanwhile, data a00, a10, are read from constant register file 101 in the processing elements PE1 and PE2. Therefore, through the operation of multiplier 104, the processing elements PE1 and PE2 load register 106 with a00 x00 and a10 x00 individually. Then, in the next cycle, the output of Adder 109 of PE1, PE2 would be equal to a00 x00, a10 x00 respectively. At this time, the adder control signal 94 is in the state of logic one. Also, the output of the multiplier 104 of PE1, PE2 would be equal to a01 x10 and a11 x10 respectively. Then, in the next cycle, the content of registers 106, 110 of PE1, PE2 would be a01 x10, a00 x00 and a11 x10, a10 x00 respectively. Continuously doing in this way, the output of adder 109 of PE1, PE2 would be equal to y00, y10 eventually. Meanwhile, the control signal 12 is in the state of logic zero in order to load y00, y10 into registers ro1 ro2 respectively. Then, in the following cycles, during computing y20, y30, y00, y10 are shifted into the memory M. Referred to FIG. 12, the present invention processes the matrix computation in a way similar to what has been described.

Figure 13:
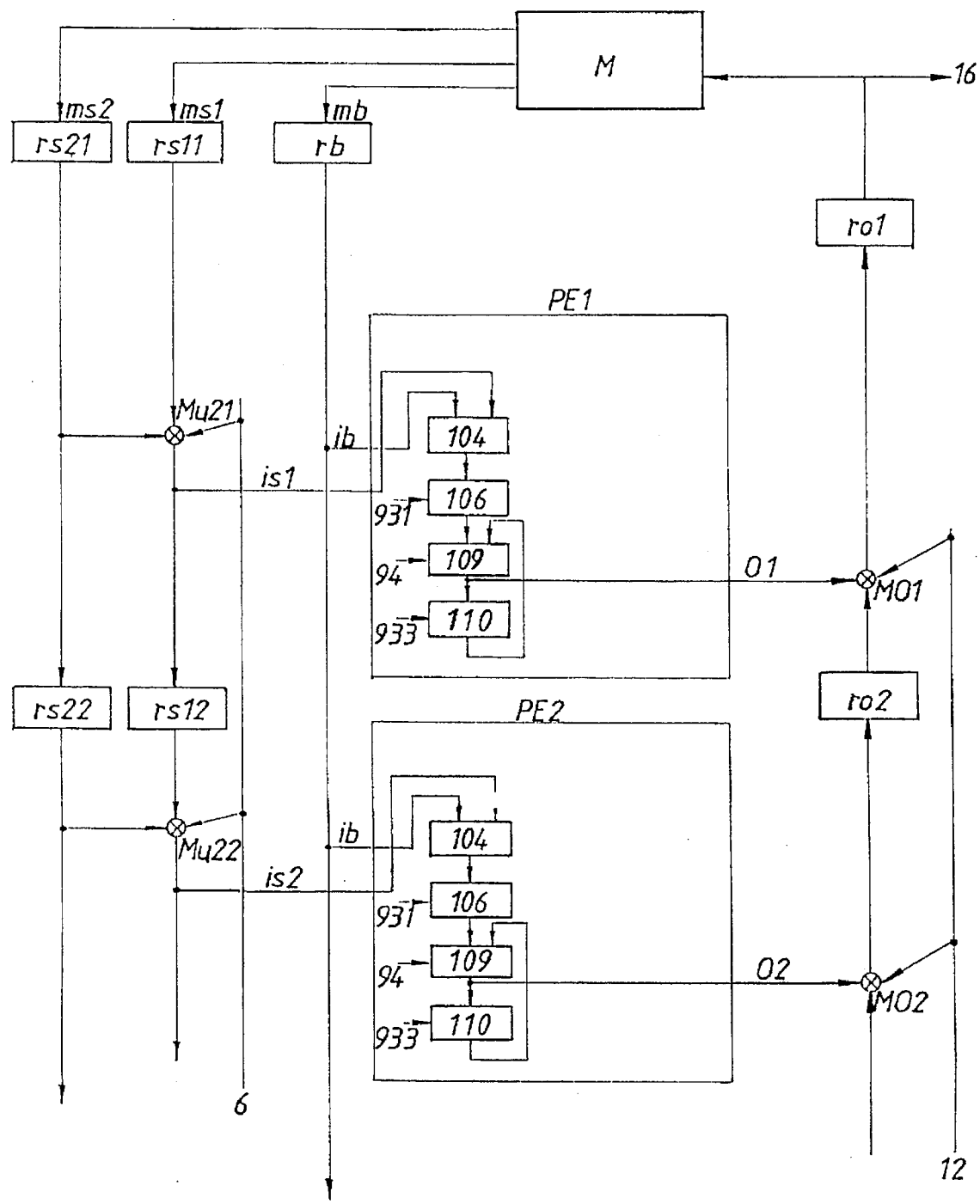
FIG. 13 is a schematic circuit diagram of the present invention for processing finite-impulse response Filtering Computation.

As shown in FIG. 13, the array processing architecture is the embodiment of the present invention for processing the finite-impulse-response filtering computation. Under the control of controller C, the processing elements are running in the second operational mode shown as FIG. 5. Meanwhile, control signals 5, 7, 13 are in the state of logic one and control the multiplexers Mu11~Mu1n, Mb, MOb. As an example, FIG. 13 shows the resulted architecture with two processing elements PE1, PE2. Also, the data processing for computing for explaining according to:

$$yi=a0\ xi+a1\ xi-1+a2\ xi-2+a3\ xi-3$$

is presented $$yi=a0\ xi+a1\ xi-1+a2\ xi-2+a3\ xi-3,$$

the computational results would be as follows:

$y0=a0\ x0+a1\ x-1+a2\ x-2+a3\ x-3$
$y1=a0\ x1+a1\ x0+a2\ x-1+a3\ x-2$
$y2=a0\ x2+a1\ x1+a2\ x0+a3\ x-1$
$y3=a0\ x3+a1\ x2+a2\ x1+a3\ x0$
$y4=a0\ x4+a1\ x3+a2\ x2+a3\ x1$
$y5=a0\ x5+a1\ x4+a2\ x3+a3\ x2$ and so forth Referred to FIG. 14, during computing yi, the present invention uses registers rs21, rs22, rs11, rs12 and multiplexers Mu21, Mu22, which are controlled by control signal 6, to transfer input data [xm]to the processing elements PE1, PE2. Meanwhile, constant data [an]is broadcasted through register rb to the processing elements PE1, PE2.

Also, the computational results yi are transferred to the memory M through registers r01, r02 and multiplexers M01, M02, which are controlled by control signal 12.

As to data transferring and processing, it would be explained as follows:

Initially, data x1 is loaded from the multiport memory M into register rs21. Then, in the next cycle, register rs21 is loaded with data x0 and register rs22 is loaded with data x1. At this time, control signal 6, which controls multiplexers Mu21, Mu22, is in the state of logic zero. Therefore, is1, is2, which are input ports of processing elements PE1, PE2 respectively, are of value x0, x1 individually. Also, register rb is loaded with data a0 so that the output of multiplier 104 is a0x0 for PE1 and a0x1 for PE2. One cycle later, control signal 6 would change to logic one, and, input data xn are transferred to PE1, PE2 through rs11, rs12. Continuously doing in this way, the output of adder 109 would become y0 for PE1 and y1 for PE2. At this time, control signal 12 is set to logic zero.

One cycle later, yo, y1 would be loaded into ro1 ro2 respectively. Then, control signal 12 is set to logic one and y0, y1 are transferred to multiport memory M or other functional unit through registers ro1, ro2. In such way the computational results for finite-impulse-response filtering would be generated.

Figure 15:
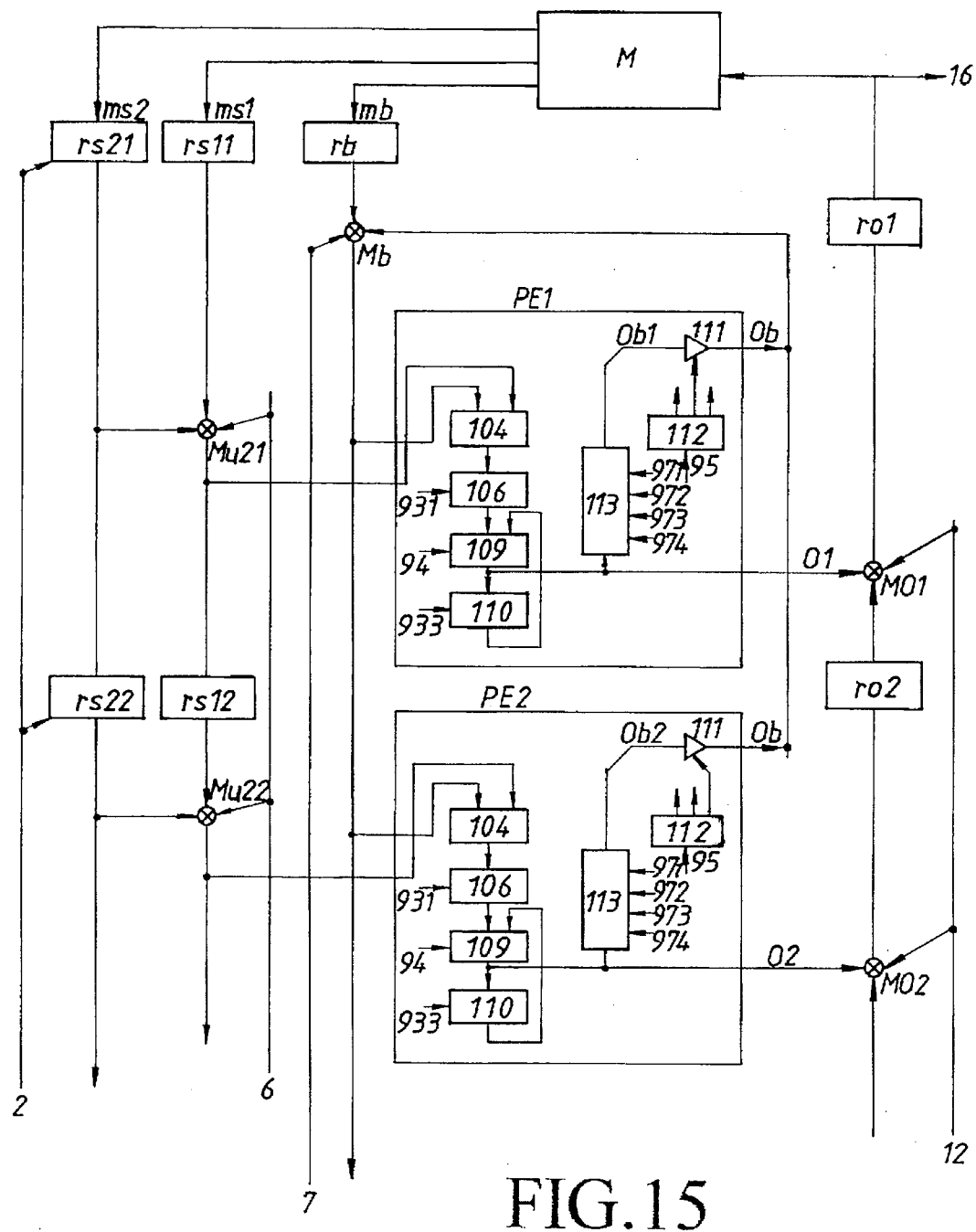
FIG. 15 is a schematic circuit diagram of the present invention for processing infinite-impulse-response filtering computation.

As shown in FIG. 15, the array processing architecture is the embodiment of the present invention for processing the infinite-impulse-response filtering computation. Under the control of controller C, the processing elements are running in the second operational mode shown as FIG. 5. Moreover the data signal ob is used for broadcasting the intermediate results to the processing elements through multiplexer Mb. Meanwhile, control signals 2, 6, 7, 12 are used for clearing registers rs21, rs22, controlling multiplexers Mu21, Mu22, controlling multiplexer Mb, and controlling multiplexers MO1, MO2 respectively. FIG. 15 shows the resulted architecture with two processing elements PE1, PE2. Except the circuits for feedback signal Ob, the architecture shown in FIG. 15 is the same as that in FIG. 13 for finite-impulse-response filtering computation. In the following the data processing for computing yi+b1 yi-1+b2 yi-2+b3 yi-3=a0 xi+a1 xi-1+a2 xi-2+a3 xi-3 is presented for explanation. Therefore, the computational results would be as follows:

$y0=-b1y-1-b2y-2-b3y-3+a0x0+a1x-1+a2x-2+a3x-3$
$y1=-b1y0-b2y-1-b3y-2+a0x1\ +a1x0+a2x-1+a3x-2$
$y2=-b1y1-b2y0-b3y-1+a0x2+a1x1+a2x0+a3x-1$
$y3=-b1y2-b2y1-b3y0+a0x3+a1x2+a2x1+a3x0$ and so forth Referred to FIG. 16, it shows that the present invention uses the processing element PE1 to compute y0, y2, y4, . . . and the processing element PE2 to compute y1, y3, y5, . . . As for data transferring and processing, it would be explained as follows:

Initially, data x1 is loaded from the multiport memory M into register rs21. Then, in the next cycle, register rs21 is loaded with data x0 and data x1 is transferred from register rs21 to register rs22. At this time, control signal 6, which controls multiplexers Mu21, Mu22, is in the state of logic zero. Therefore, is1, is2 are of value x0, x1 individually. Meanwhile, register rb is of value a0 so that the output of multiplier 104 is a0x0 for PE1 and a0x1 for PE2. In the next cycle, control signal 6 would change to logic one. Then, data xn are transferred to PE1, PE2 through rs11, rs12. During the computation, control signal 2 is set to logic one, when data signals 01, 02 of PE1, PE2 are equal to a0x0+a1x-1, a0x1+a1x0 respectively, to clear registers rs21, rs22. Then, in the following cycles, data -bn are transferred to processing elements PE1, PE2 through the cooperation of registers rs21, rs22, rs11, rs12 and multiplexers Mu21, Mu22. On the other hand, ym are sent to PE1, PE2 by broadcasting. After y0 is computed, it is broadcasted to PE1, PE2 to compute y1. Then, y0, y1 are transferred to registers r01, r02, by setting control signal 12to logic zero, and shifted to multiport memory M in the following cycles. Continuously doing in this way, the computational results for infinite-impulse-response filtering would be generated.

Figure 17:
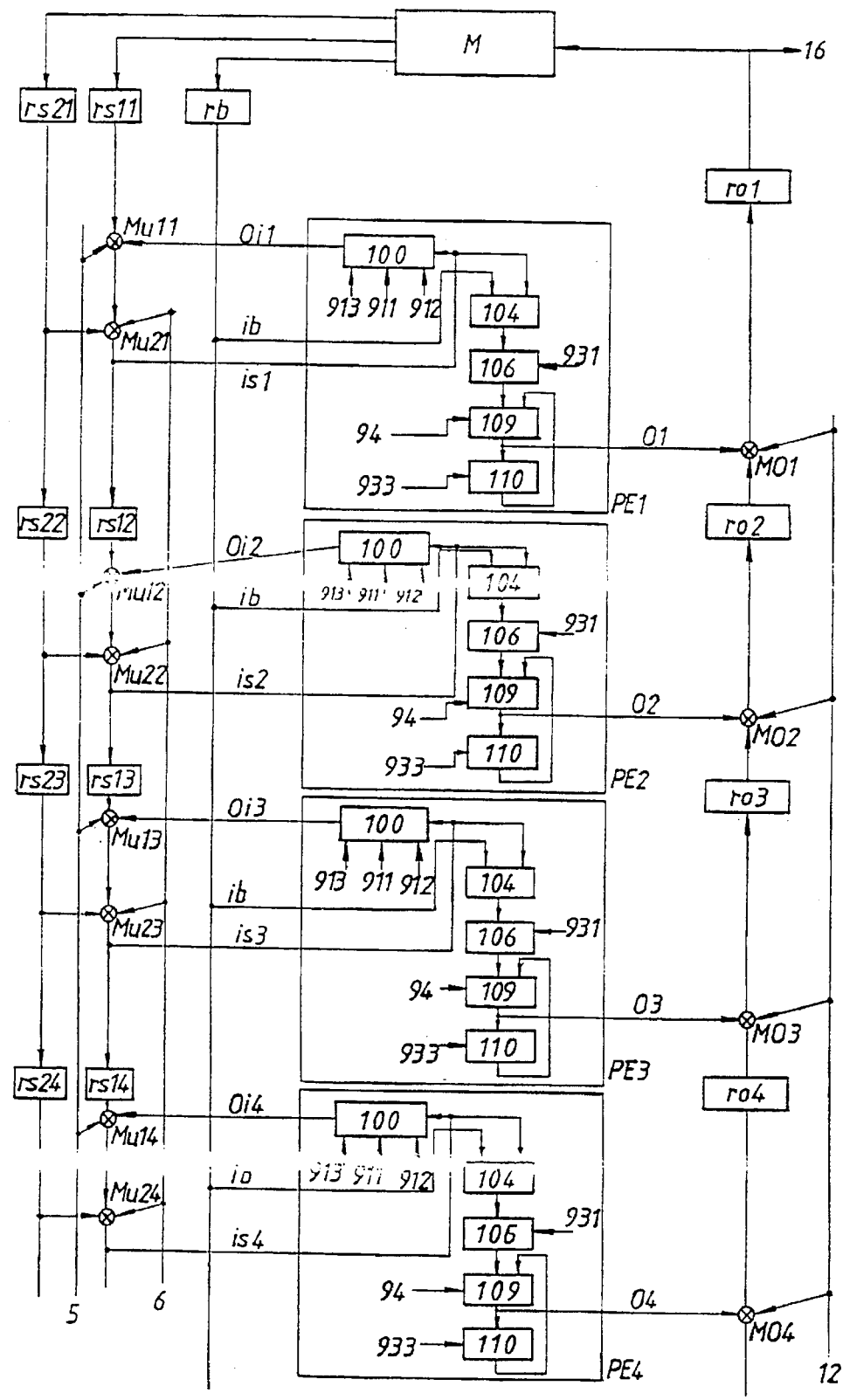
FIG. 17 is a schematic circuit diagram of the present invention for processing edge-detection and smoothing computation.

As shown in FIG. 17, the array processing architecture is the embodiment of the present invention for processing the computation of edge detection and smoothing. Under the control of controller C, the processing elements are running in the second operational mode shown as FIG. 5. Moreover, the first-in first-out memory 100 is used as data buffer. FIG. 17 shows the resulted architecture with four processing elements PE1, PE2, PE3, PE4. Also, the following computation is used for explanation:

$y30=x50\ w20+x51\ w21+x52\ w22$
$y31=x51\ w20+x52\ w21+x53\ w22+x40\ w10+x41\ w11+x42$
  $w12+x41\ w10+x42\ w11+x43\ w12+x30\ w00+x31\ w01+$
  $x32\ w02+x31\ w00+x32\ w01+x33\ w02$
$y20=x40\ w20+x41\ w21+x42\ w22$
$y21=x41\ w20+x42\ w21+x43\ w22+x30\ w10+x31\ w11+x32$
  $w12+x31\ w10+x32\ w11+x33\ w12+x20\ w00+x21\ w01+$
  $x22\ w02+x21\ w00+x22\ w01+x23\ w02$
$y10=x30\ w20+x31\ w21+x32\ w22$
$y11=x31\ w20+x32\ w21+x33\ w22+x20\ w10+x21\ w11+x22$
  $w12+x21\ w10+x22\ w11+x23\ w12+x10\ w00+x11\ w01+$
  $x12\ w02+x11\ w00+x12\ w01+x13\ w02$
$y00=x20\ w20+x21\ w21+x22\ w22$
$y01=x21\ w20+x22\ w21+x23\ w22+x10\ w10+x11\ w11+x12$
  $w12+x11\ w10+x12\ w11+x13\ w12+x00\ w00+x01\ w01+$
  $x02\ w02+x01\ w00+x02\ w01+x03\ w02$

During data processing, the processing element PE1 is used to compute y30, y31; PE2 is to compute y20, y21; PE3 is to compute y10, y11; PE4 is to compute y00, y01. Referred to FIGS. 18A, 18B, and 19, the data transferring and processing can be explained as follows:

Initially, data x30, x20, x10, x00 are loaded into registers rs21, rs22, rs23, rs24 from multiport memory by shifting. At this time, control signal 6, which controls multiplexers Mu21, Mu22, Mu23, Mu24, is set to logic zero. Therefore, is1, is2, is3, is4 are of value x30, x20, x10, x00 respectively. Meanwhile, register rb is of value w00 so that the output of multiplier 104 is x30w00, x20w00, x10w00, x00w00 for processing elements PE1, PE2, PE3, PE4 individually.

During the following cycles, control signal 6 is set to logic one. Then x40, x50 are shifted through register rs11 and registers rs21, rs22, rs23, rs24 are for preloading x01, x11, x21, x31. Continuously doing in this way, y30, y20, y10, y00 would be computed by PE1, PE2, PE3, PE4. Also, during computing y30, y20, y10, y00, data x31, x32 would be stored in the first-in first-out memory 100 of PE1 through the control of write control signal 912. Similarly, data x21, x22, x11, x12, x01, x02 are stored in the first-in first-out memory 100 of PE2, PE3, PE4 respectively. In this way, during computing y31, y21, y11, y01, data x31, x21, x11, x01 are read from first-in first-out memory 100 instead of registers rs21, rs22, rs23, rs24. Therefore, only data x33, x23, x13, x03 are loaded through registers rs21, rs22, rs23, rs24. This can save a lot of data loading time when y32, y22, y12, y02, y33, y23, y13, y03, etc. are also computed. During computing yij, constant data wkl, $0 \leq k, l < 3$, are sent to the processing elements through register rb by broadcasting. Also, yij are shifted to multiport memory M or other functional unit through registers ro1, ro2, ro3, ro4 and multiplexers MO1, MO2, MO3, MO4 under the control of control signal 12.

Figure 20:
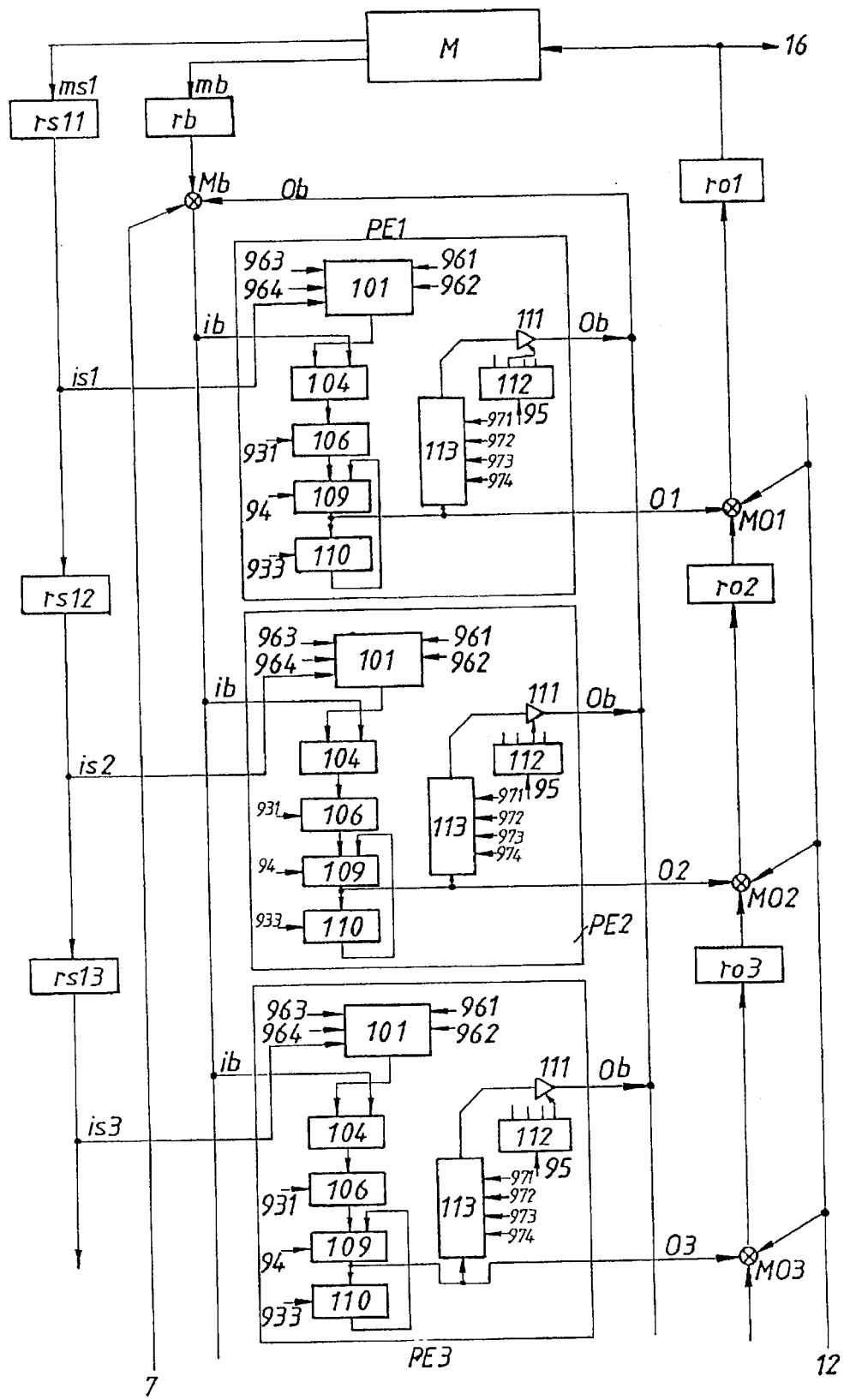
FIG. 20 is a schematic circuit diagram of the present invention for processing two-dimensional discrete cosine transform.

As shown in FIG. 20, the array processing architecture is the embodiment of the present invention for processing the two-dimensional discrete cosine transform. Under the control of controller C, the processing elements are running in the first operational mode shown as FIG. 4. Moreover, constant register file 101, data register file 113, decoder 112, tristate buffer 111 are also involved in this computation. Here, the following computation is used as an example for explanation:

$$\begin{bmatrix} a00\ a01\ a02 \\ a10\ a11\ a12 \\ a20\ a21\ a22 \end{bmatrix} \left( \begin{bmatrix} a00\ a01\ a02 \\ a10\ a11\ a12 \\ a20\ a21\ a22 \end{bmatrix} \begin{bmatrix} x00\ x01\ x02 \\ x10\ x11\ x12 \\ x20\ x21\ x22 \end{bmatrix}^T \right) = \left( \begin{bmatrix} z00\ z01\ z02 \\ z10\ z11\ z12 \\ z20\ z21\ z22 \end{bmatrix} \right)^T$$

where T represents transposition.

This is to compute [zij] which is the two-dimensional discrete cosine transform of the 3×3 matrix [xij].

The first step is to compute column—transform, $$\begin{bmatrix} a00\ a01\ a02 \\ a10\ a11\ a12 \\ a20\ a21\ a22 \end{bmatrix} \begin{bmatrix} x00\ x01\ x02 \\ x10\ x11\ x12 \\ x20\ x21\ x22 \end{bmatrix} = \begin{bmatrix} y00\ y01\ y02 \\ y10\ y11\ y12 \\ y20\ y21\ y22 \end{bmatrix},$$

then, compute the row—transform, $$\begin{bmatrix} a00\ a01\ a02 \\ a10\ a11\ a12 \\ a20\ a21\ a22 \end{bmatrix} \left( \begin{bmatrix} y00\ y01\ y02 \\ y10\ y11\ y12 \\ y20\ y21\ y22 \end{bmatrix} \right)^T = \left( \begin{bmatrix} z00\ z01\ z02 \\ z10\ z11\ z12 \\ z20\ z21\ z22 \end{bmatrix} \right)^T$$

Figure 22:
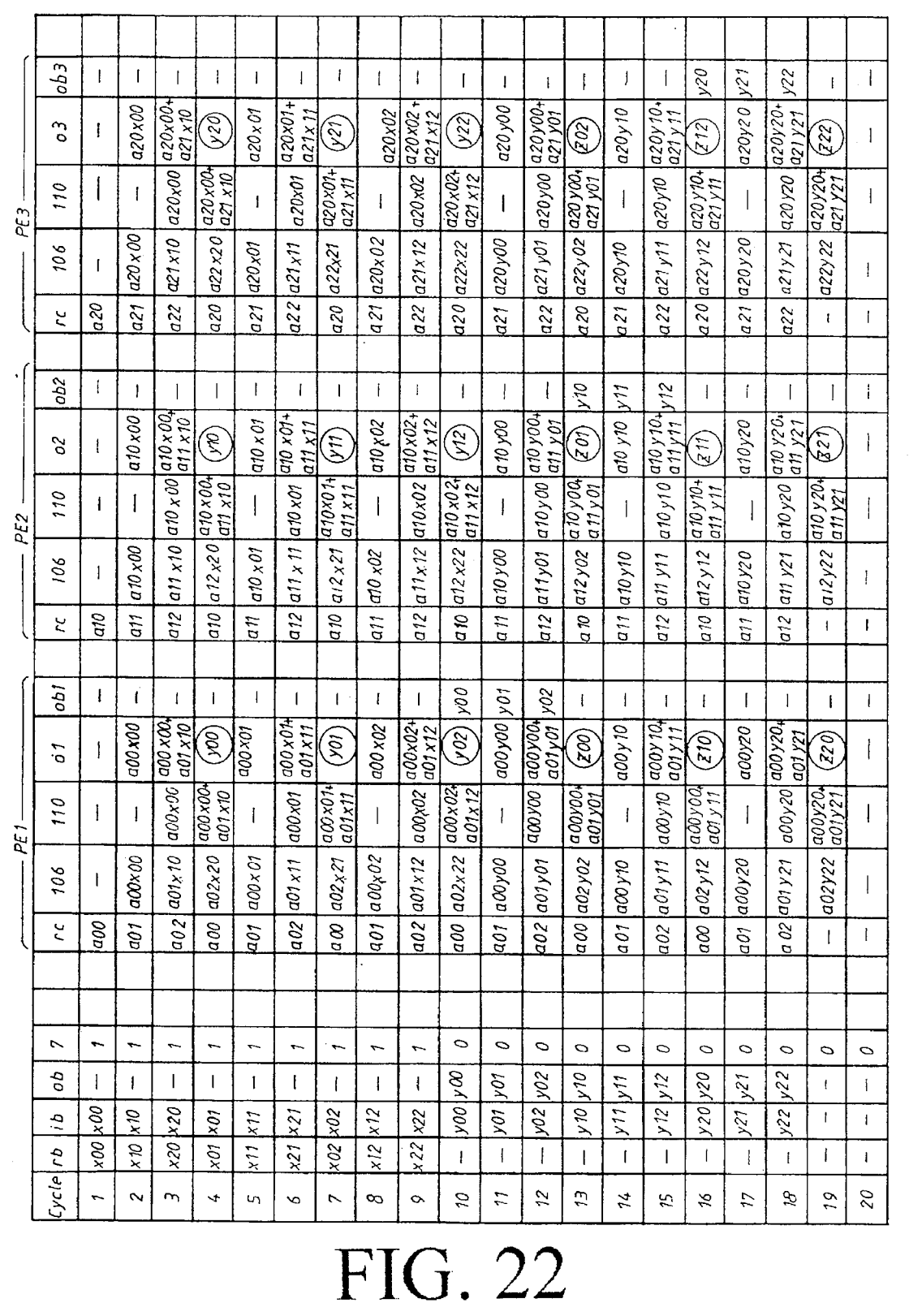

Referred to FIG. 21, FIG. 22 and FIG. 23, the loading of data, data processing and the operation of control signals can be explained as follows:

As shown in FIG. 21, first of all, data aij are loaded into the constant register file 101 in the processing elements PE1, PE2, PE3. Then, shown as FIG. 22, data xij are loaded from multiport memory M into register rb by the following sequence:

x00, x10, x20, x01, x11, x21, x02, x12, x22.

In this way, processing element PE1 would compute y00, y01, y02, PE2 would compute y10, y11, y12, and PE3 would compute y20, y21, y22. Afterwards, by using decoder 112 to generate control signal to control tristate buffer 111, yij would be sent back to the input ib of the processing elements through multiplexer Mb by the following sequence:

y00, y01, y02, y10, y11, y12, y20, y21, y22.

Finally, the two-dimensional discrete cosine transform would be computed.

Figure 24:
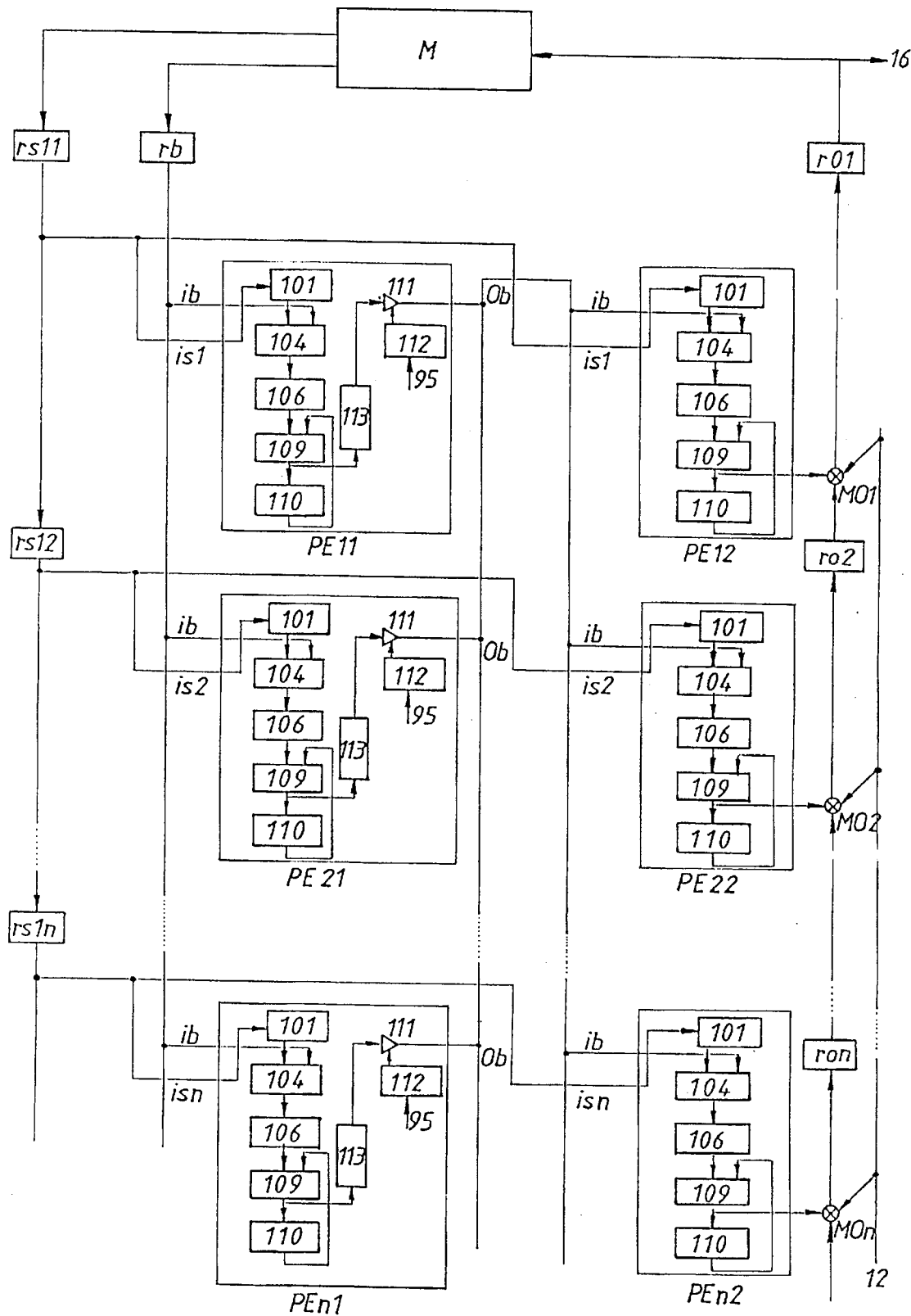
FIG. 24 is a schematic circuit diagram for two-dimensional array processing architecture of the present invention.
Figure 25:
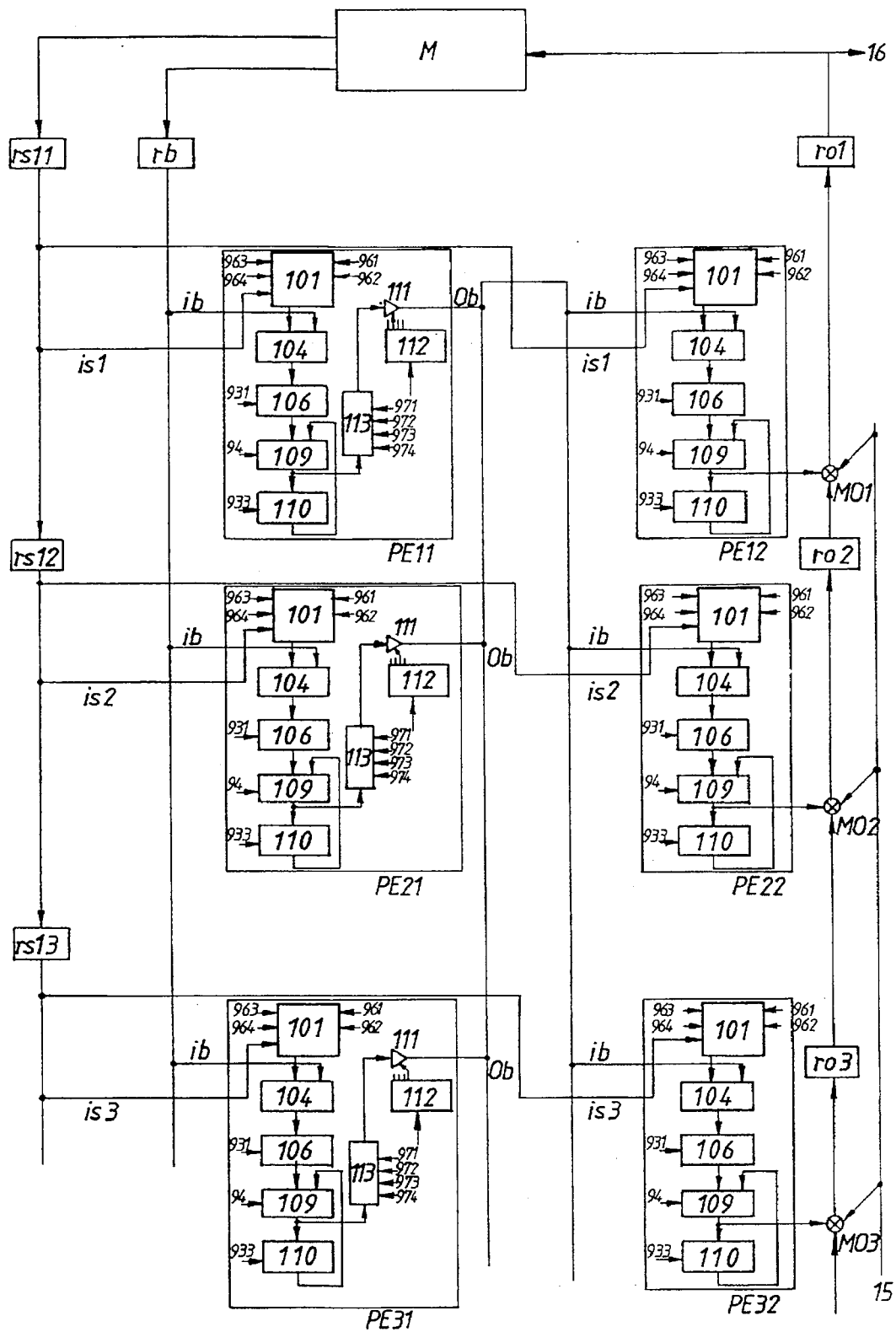
FIG. 25 represents an implementation of two-dimensional array processing architecture of the present invention.

As shown in FIG. 24, the array processing architecture is the two-dimensional embodiment of the present invention. As an example, shown as FIG. 25, six processing elements PE11, PE12, PE21, PE22, PE31, PE32 are used to explain the process of computing the two-dimensional discrete cosine transform. Referred to FIG. 26, FIG. 27, and FIG. 28, data loading, control sequence of control signals, and operational method can be explained as follows: as shown in FIG. 26, first of all, data aij are loaded into the constant register files 101 in the processing elements PE11, PE21, PE31, PE12, PE22, PE32. Then, shown as FIG. 27, data xij are loaded from multiport memory M into register rb by the following sequence:

x00, x10, x20, x01, x11, x21, x02, x12, x22.

In this way, processing element PE11 would compute y00, y01, y02, PE21 would compute y10, y11, y12, and PE31 would compute y20, y21, y22. Afterwards, shown as FIG. 28, by using decoder 112 to generate control signal to control tristate buffer 111, yij computed by PE11, PE21, PE31 would be sent to the input ib of the processing elements PE12, PE22, PE32 by the following sequence:

y00, y01, y02, y10, y11, y12, y20, y21, y22.

Then, processing element PE12 would compute Z00, Z10, Z20, PE22 would compute Z01, Z11, Z21, and PE32 would compute Z02, Z12, Z22. In this way, the two-dimensional array processing architecture can achieve the effect of processing the two-dimensional discrete cosine transform.

Figure 29:
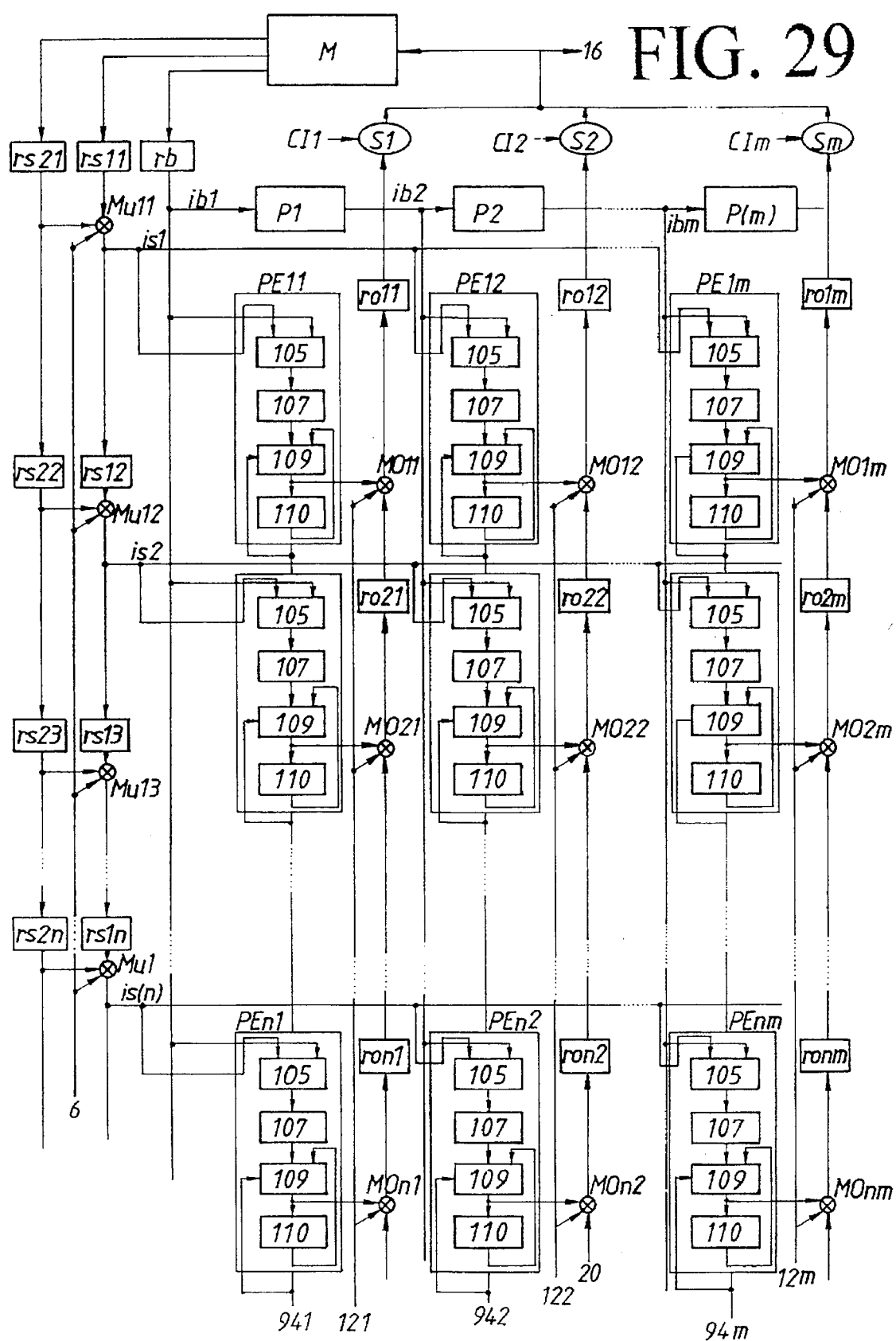
FIG. 29 is a schematic circuit diagram for two-dimensional array processing architecture of the present invention for processing image template matching and motion estimation.
Figure 30:
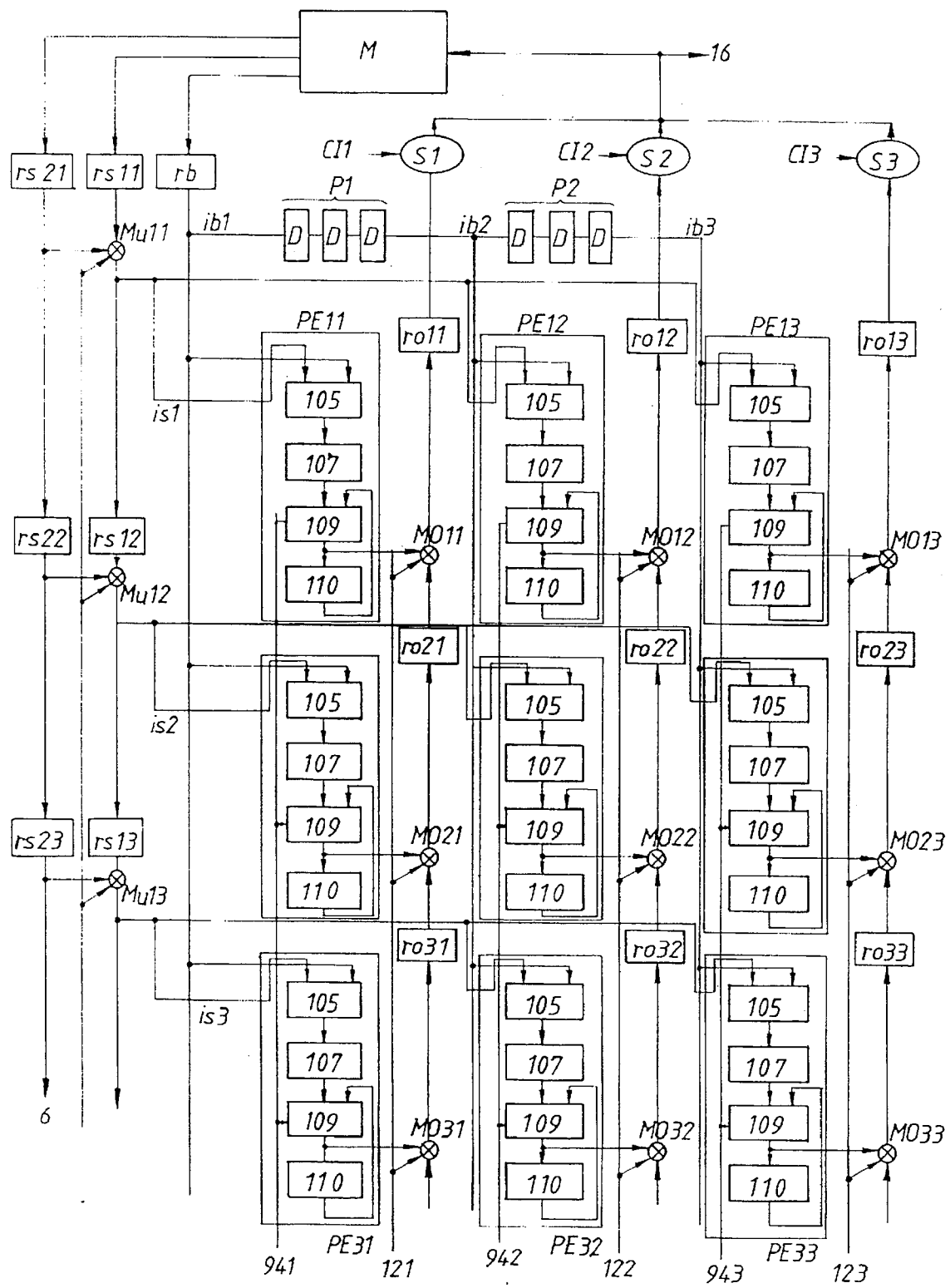
FIG. 30 represents an implementation of two-dimensional array processing architecture of the present invention for processing image template matching and motion estimation.

As shown in FIG. 29, the array processing architecture is a two-dimensional embodiment, which comprises n×m processing elements, of the present invention for processing the operations of motion estimation and template matching. Here, P1, P2, Pm represent programmable delays. As an example, shown as FIG. 30, a 3×3 processing array is used to explain the operation. Here, P1, P2 are 3-clock-cycle delays. Moreover, the processing elements PE11, PE12, PE13, PE21, PE22, PE23, PE31, PE32, PE33 are running under the sixth operational mode which is shown as FIG. 9. For explanation, the following computation is used as an example:

$$z20 = |x20 - y40| + |x21 - y41| + |x22 - y42| +$$
$$|x10 - y30| + |x11 - y31| + |x12 - y32| +$$
$$|x00 - y20| + |x01 - y21| + |x02 - y22|,$$
$$z10 = |x20 - y30| + |x21 - y31| + |x22 - y32| +$$
$$|x10 - y20| + |x11 - y21| + |x12 - y22| +$$
$$|x00 - y10| + |x01 - y11| + |x02 - y12|,$$
$$z00 = |x20 - y20| + |x21 - y21| + |x22 - y22| +$$
$$|x10 - y10| + |x11 - y11| + |x12 - y12| +$$
$$|x00 - y00| + |x01 - y01| + |x02 - y02|,$$
$$z21 = |x20 - y41| + |x21 - y42| + |x22 - y43| +$$
$$|x10 - y31| + |x11 - y32| + |x12 - y33| +$$
$$|x00 - y21| + |x01 - y22| + |x02 - y23|,$$
$$z11 = |x20 - y31| + |x21 - y32| + |x22 - y33| +$$
$$|x10 - y21| + |x11 - y22| + |x12 - y23| +$$
$$|x00 - y11| + |x01 - y12| + |x02 - y13|,$$
$$z01 = |x20 - y21| + |x21 - y22| + |x22 - y23| +$$
$$|x10 - y11| + |x11 - y12| + |x12 - y13| +$$
$$|x00 - y01| + |x01 - y02| + |x02 - y03|,$$
$$z22 = |x20 - y42| + |x21 - y43| + |x22 - y44| +$$
$$|x10 - y32| + |x11 - y33| + |x12 - y34| +$$
$$|x00 - y22| + |x01 - y23| + |x02 - y24|,$$
$$z12 = |x20 - y32| + |x21 - y33| + |x22 - y34| +$$
$$|x10 - y22| + |x11 - y23| + |x12 - y24| +$$
$$|x00 - y12| + |x01 - y13| + |x02 - y14|,$$
$$z02 = |x20 - y22| + |x21 - y23| + |x22 - y24| +$$
$$|x10 - y12| + |x11 - y13| + |x12 - y14| +$$
$$|x00 - y02| + |x01 - y03| + |x02 - y02|.$$

Referred to FIGS. 31A, 31B, and 32, processing element PE11 is used to compute z20, PE21, PE31 are to compute z10, z00 respectively, PE12, PE22, PE32 are to compute z21, z11, z01 respectively, and PE13, PE23, PE33 are to compute z22, z12, z02 respectively. Totally, this array processing architecture can achieve the function of processing both motion estimation and template matching.

Figure 33:
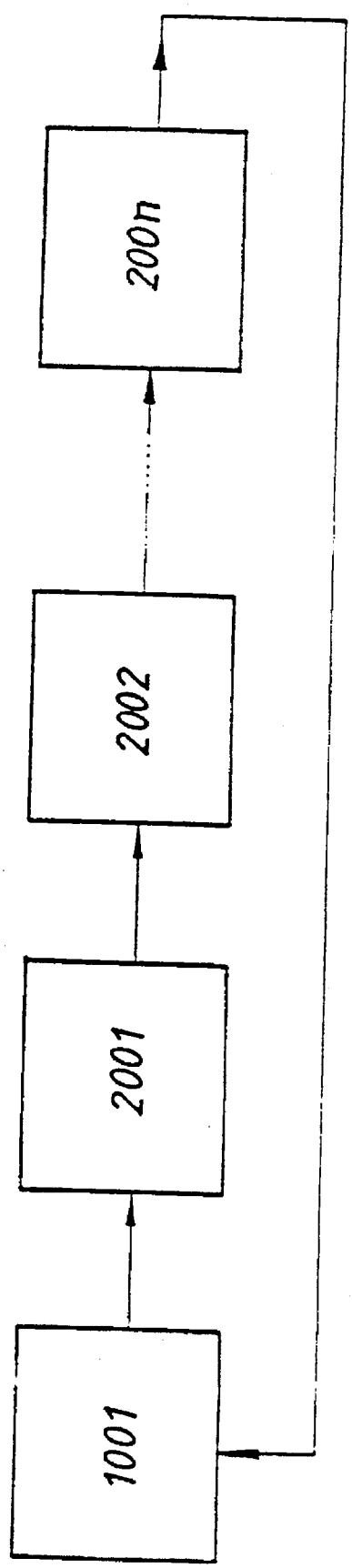
FIG. 33 shows that the array processing architecture of the present invention can be cascaded to form stage-pipelined architectures.
Figure 34:
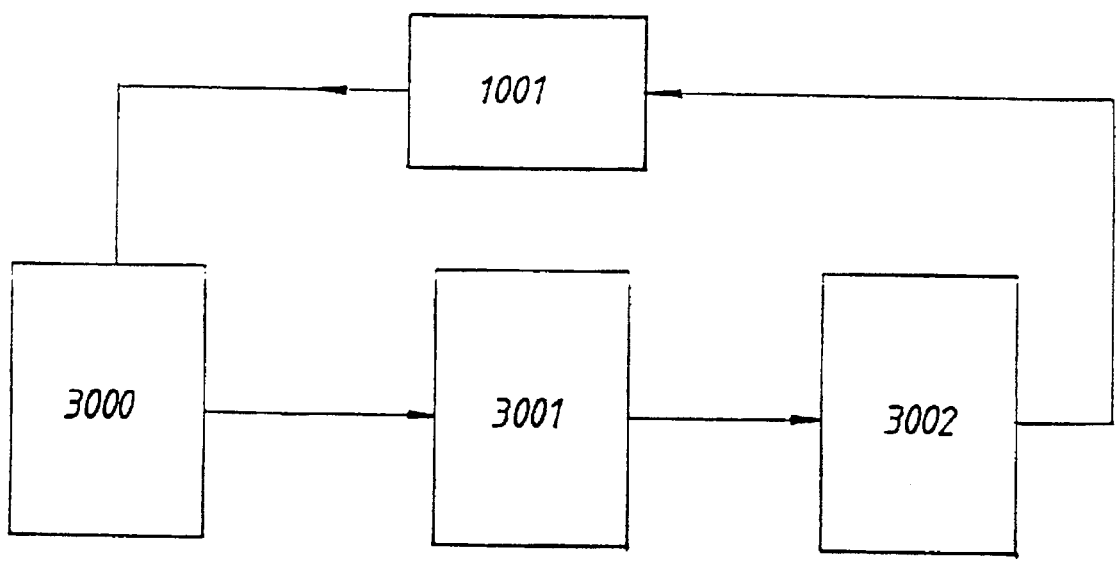
FIG. 34 shows how the array processing architectures of the present invention are cascaded to form a stage-pipelined architecture to compute 1008-point discrete Fourier transform.
Figure 35:
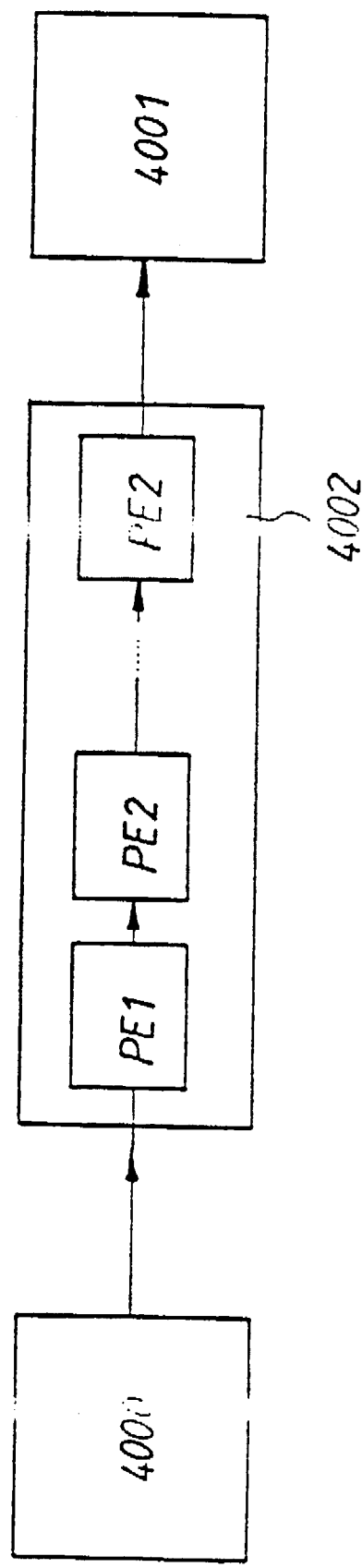
FIG. 35 shows how the array processing architectures of the present invention can be combined with systolic architectures.
Figure 36:
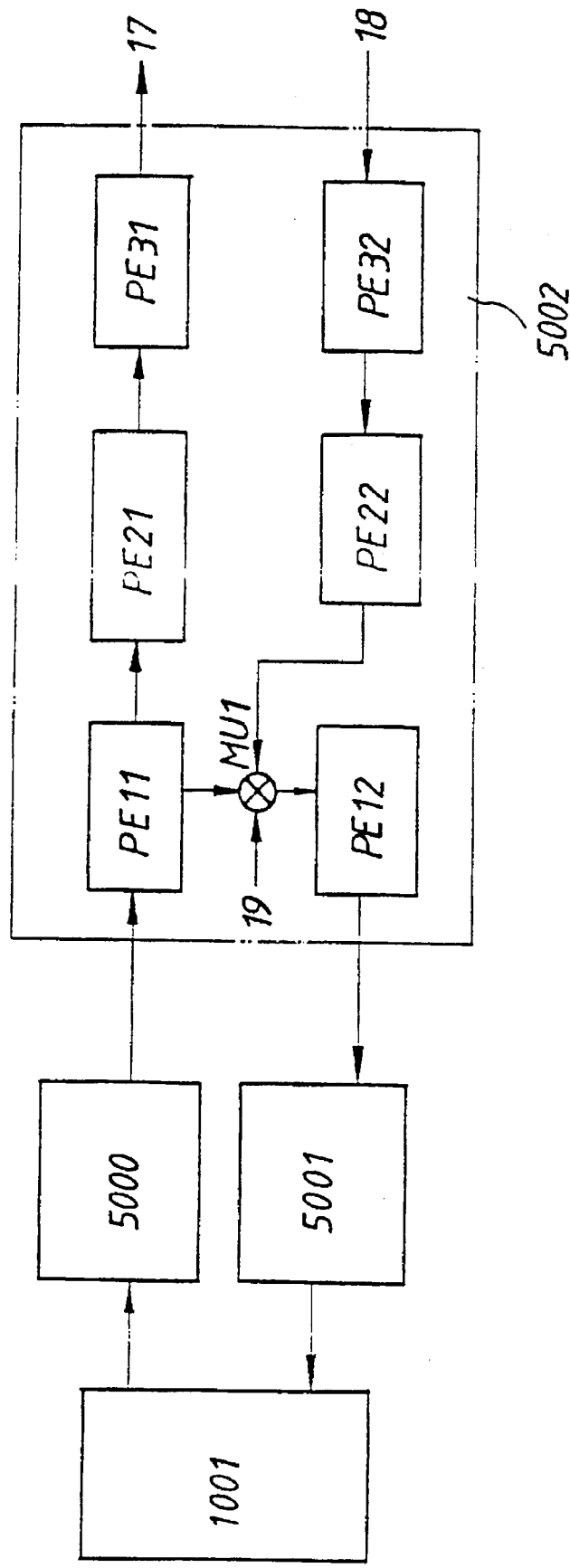
FIG. 36 shows how the array processing architectures of the present invention can be applied to the implementation of image compression systems.

As shown in FIG. 33, the array processing architecture is a stage-pipelined embodiment of the present invention. Such an array processing architecture comprises n pipelined SIMD-Systotic array processing architectures, which are cascaded in a pipelined manner, and is called stage-pipelined architecture. Also, such architecture can be combined with a general purpose processor 1001 to enhance its computational performance. Shown as FIG. 34, the computation of 1008-point discrete Fourier transform is used as an example for explanation. A general purpose processor 1001 is cascaded with three pipelined SIMD-Systolic array processing architectures 3000, 3001, 3002 which are for computing 7-point, 9-point, 16-point discrete Fourier transform respectively. By using such an architecture, the 1008-point discrete Fourier transform can be computed with a high computational performance. As shown in FIG. 35, the array processing architecture is an embodiment of combining the present invention with systolic architecture which comprises of multiple processing elements. Referred to FIG. 35, a group of processing elements PE1~PEn, which form a systolic architecture 4002, is added between pipelined SIMD-Systolic array processing architectures 4000 and 4001. Also, such an architecture can be combined with a general purpose processor. Referred to FIG. 36, the implementation of an image compression system is used as an example for explanation. Two pipelined SIMD-Systolic array processing architectures 5000, 5001, which compute two-dimensional discrete cosine transform and inverse discrete cosine transform individually, are combined with a systolic architecture 5002 in one end and with a general purpose processor 1001 in the other end. Also, the systolic architecture 5002 comprises quantizer PE11, Zig-Zag scan processor PE21, coder PE31, dequantizer PE12, inverse Zig-Zag scan processor PE22, decoder PE32 and multiplexer Mu1. All of the processing elements in the systolic architecture 5002 are cascaded systolically. Meanwhile, control signal 19 is to choose the operational mode. If control signal 19 is of logic one, data input of dequantizer PE12 is from the output of quantizer PE11. Therefore, the whole system is running the encoding process. On the other hand, the control signal 19 is of logic zero, data input of dequantizer PE12 is from the output of inverse Zig-Zag scan processor PE22. Then, the whole system is running the decoding process.

In such manner, the effect of image compression function can be achieved.

As described above, the present invention is related to pipelined SIMD-Systolic array processing architecture and its computing methods.

The present invention controls data processing, data transferring and data input/output in a concurrent manner. Therefore, computational performance can be increased. Also, the present invention can save data lines and increase the memory efficiency.

Therefore, it is possible to fabricate the present invention on single VLSI chip. Totally, the present invention of practicability to the industry.

I claim:

1. A pipelined SIMD-systolic array processor, including:

a controller;

a number of processing elements constructed as an array architecture, wherein each processing element is arranged to operate independently of other processing elements in the array architecture and comprises a multiplier, an adder, a register, an input port and an output port, an output end of the multiplier is connected with an input end of the adder, an input end of the multiplier is connected with the input port of one of the processing elements for receiving input data, an output end of the adder is connected with the register, an output end of the register is connected to another end of the adder, the output end of the adder is also connected to the output port of said one of the processing elements, and the adder and the register are controlled by said controller;

means including a number of shift register arrays, respectively disposed at the input ports and output ports of the processing elements of said array architecture, for shifting input data from memory to said processing elements, and for shifting output data from said processing elements to memory;

means including a number of multiplexers, disposed at transmitting ends of the shift register arrays, for loading data into the shift register arrays;

a set of broadcasting data lines, connected with respective input ports of the processing elements of said array architecture, for receiving feedback data output by the processing elements of said array architecture and for receiving data from the memory, wherein the memory is a multi-port memory connected with front ends of the shift register arrays, and wherein the registers, multiplexers and multi-port memory are controlled by said controller.

2. A processor according to claim 1, wherein in each processing element, a further register is connected between an output end of the multiplier and an input end of the adder.

3. A processor according to claim 1, wherein in each processing element, a constant register is connected between input port of the processing element and another end of the multiplier, and a further register is connected between an output end of the multiplier and an input end of the adder.

4. A processor according to claim 1, wherein in each processing element, a first-in first-out memory is disposed for receiving input data of each processing element and provided as another output of the processing element, and a further register is connected between an output end of the multiplier and an input end of the adder.

5. A processor according to claim 1, wherein each processing element further includes:
a constant register file, connected between the input port of the processing element and an input end of the multiplier;
a further register, connected between an output end of the multiplier and an input end of the adder;
a data register file, connected to the output end of the adder; and
a tristate buffer and a decoder for connecting an output end of the data register file and providing another output end of the processing element;
wherein above said constant register file, the further register, data register file, tristate buffer and decoder are all controlled by said controller.

6. A processor according to claim 1, wherein said array architecture is constructed as a two-dimensional array.

7. A processor according to claim 1, wherein the array architecture is constructed as a stage-pipelined array architecture, connected with a general purpose processor.

8. A processor according to claim 1, wherein a front and rear of the array architecture is connected with a systolic architecture constructed by said processing elements, and the systolic architecture is connected to and controlled by a general purpose processor.

9. A pipelined SIMD-Systolic array processor, including:
a controller;
a number of processing elements constructed as an array architecture, wherein each processing element comprises an adder, a register, a multiplier, an input port and an output port, an input end of the adder and an input end of the multiplier is connected with the input port of the processing element for receiving input data, the register is connected between an output end of the adder and another input end of the multiplier, an output of the register is connected to another input end of the adder, an output of the multiplier is connected to the output port of the processing element, and the adder and the register are controlled by said controller;
means including a number of shift register arrays, respectively disposed at the input ports and output ports of the processing elements of said array architecture, for shifting input data from memory to said processing elements, and for shifting output data from said processing elements to memory;
means including a number of multiplexers, disposed at transmitting ends of the shift register arrays, for loading data into the shift register arrays;
a set of broadcasting data lines, connected with respective input ports of the processing elements of said array architecture, for receiving feedback data output by the processing elements of said array architecture and for receiving data from the memory
wherein the memory is a multi-port memory connected with front ends of the shift register arrays, and
wherein the registers, multiplexers and multi-port memory are controlled by said controller.

10. A processor according to claim 9, wherein in each processing element, a constant register file is connected between the input port of processing element and said an input end of multiplier, and the constant register file is also controlled by said contoller.

11. A processor according to claim 9, wherein in each processing element, a constant register file is connected between the input port of processing element and said an input end of multiplier, the output end of the multiplier is connected with a data register file which is in turn connected with a tristate buffer and a decoder which provides another output of the processing element, and the constant register file, data register file, tristate buffer and decoder are all also controlled by said controller.

12. A processor according to claim 9, wherein in each processing element, a first-in first-out memory is disposed for receiving input data of the processing element and provided as another output of the processing element, and the first-in first-out memory is also controlled by said controller.

13. A processor according to claim 9, wherein said array architecture is constructed as a two-dimensional array.

14. A processor according to claim 9, wherein the array architecture is constructed as a stage-pipelined array architecture, connected with a general purpose processor.

15. A processor according to claim 9, wherein a front and rear of the array architecture is connected with a systolic architecture constructed by said processing elements, and the systolic architecture is connected to and controlled by a general purpose processor.

16. A pipelined SIMD-Systolic array processor, including:
a controller;
a number of processing elements constructed as an array architecture, wherein each processing element comprises an absolute-difference operational element, a multiplier, an adder, a register, an input port and an output port, an input end of the absolute difference operational element is connected with the input port of the processing element, an output end of the absolute-difference operational element is connected to the multiplier, an output end of the multiplier is connected to an input end of the adder, an output end of the adder is connected with the register, an output of the register is connected to another input end of the adder, the output end of the adder is connected to the output port of the processing element, and the adder and the register are controlled by said controller;
means including a number of shift register arrays, respectively disposed at the input ports and output ports of the processing elements of said array architecture, for shifting input data from memory to said processing elements, and for shifting output data from said processing elements to memory;
means including a number of multiplexers, disposed at transmitting ends of the shift register arrays, for loading data into the shift register arrays;
a set of broadcasting data lines, connected with respective input ports of the processing elements of said array architecture, for receiving feedback data output by the processing elements of said array architecture and for receiving data from the memory,
wherein the memory is a multi-port memory connected with front ends of the shift register arrays, and
wherein the registers, multiplexers and multi-port memory are controlled by said controller.

17. A processor according to claim 3, wherein in each processing element, a second register is connected between an output end of the absolute-difference operational element and the input end of the multiplier, a third register is connected between the output end of the multiplier and an input end of the adder, and the second and third registers are also controlled by said controller.

18. A processor according to claim 16, wherein in each processing element, a first-in first-out memory is disposed for receiving input data of the processing element and provided as another output of the processing element, and the first-in first-out memory is also controlled by said controller.

19. A processor according to claim 16, wherein in each processing element, a data register file is connected with the output end of the adder, a tristate buffer and a decoder are in turn connected with the data register file, and the data register file, tristate buffer, and the decoder are also controlled by said controller.

20. A processor according to claim 16, wherein said array architecture is constructed as a two-dimensional array.

21. A processor according to claim 16, wherein the array architecture is constructed as a stage-pipelined array architecture, connected with a general purpose processor.

22. A processor according to claim 16, wherein a front and rear of the array architecture is connected with a systolic architecture constructed by said processing elements, and the systolic architecture is connected to and controlled by a general purpose processor.

23. A pipelined SIMD-Systolic array processor, including:
a controller;
a number of processing elements constructed as an array architecture, wherein each processing element comprises an absolute-difference operational element, a register, an adder, an input port and an output port, an input end of the absolute difference operational element is connected with the input port of the processing element, an output end of the absolute-difference operational element is connected to an input end of the adder, an output end of the adder is connected with the register, an output end of the register is connected to another input end of the adder, the output end of the adder is connected to the output port of the processing element, and the adder and the register are controlled by said controller;
means including a number of shift register arrays, respectively disposed at the input ports and output ports of the processing elements of said array architecture, for shifting input data from memory to said processing elements, and for shifting output data from said processing elements to memory;
means including a number of multiplexers, disposed at transmitting ends of the shift register arrays, for loading data into the shift register arrays;
a set of broadcasting data lines, connected with respective input ports of the processing elements of said array architecture, for receiving feedback data output by the processing elements of said array architecture and for receiving data from the memory,
wherein the memory is a multi-port memory connected with front ends of the shift register arrays, and
wherein the registers, multiplexers and multi-port memory are controlled by said controller.

24. A processor according to claim 23, wherein in each processing element, a further register is connected between the output end of the absolute-difference operational element and an input end of the adder, and the further register is also controlled by said controller.

25. A processor according to claim 23, wherein in each processing element, a first-in first-out memory is disposed for receiving input data of the processing element and provided as another output of the processing element, and the first-in first-out memory is also controlled by said controller.

26. A processor according to claim 23, wherein in each processing element, a data register file is connected with the output end of the adder, a tristate buffer and a decoder are in turn connected with the output end of the data register file, and the data register file, tristate buffer and decoder are all controlled by said controller.

27. A processor according to claim 23, wherein said array architecture is constructed as a two-dimensional array.

28. A processor according to claim 23, wherein the array architecture is constructed as a stage-pipelined array architecture, connected with a general purpose processor.

29. A processor according to claim 23, wherein a front and rear of the array architecture is connected with a systolic architecture constructed by said processing elements, and the systolic architecture is connected to and controlled by a general purpose processor.

30. A pipelined SIMD-Systolic array processor, including:
a number of cascaded pipelined processing elements,
wherein each pipelined processing element comprises:
a first register having an input connected to the output of a multiplier, said first register also having an output;
a second register having an input connected to an output of an adder, said second register also having an output;
a third register having an input connected to an output of an absolute-difference operational element, said third register also having an output;
a first multiplexer for selecting data from a constant register file, a first input port, or a third register, said first multiplexer having an output connected to the input of said multiplier;
a second multiplexer for selecting data from the first input port, a second input port, the first register, the third register, or the second register, said second multiplexer having an output connected to the input of a multiplier;
a third multiplexer for selecting data from the first register, the third register, a data register file or the second input port and having an output connected to an input of said adder;
a fourth multiplexer for selecting data from said adder or multiplier, said fourth multiplexer also having an output;
said first input port being arranged to receive data from an input broadcasting circuit connected to inputs of said first multiplexer, said second multiplexer, and said absolute-difference operational element;
a second input port for receiving systolic data from a first input shift-register array being connected to the inputs of said second multiplexer, said third multiplexer, a first-in first-out memory, a constant register file, and said absolute-difference operational element;
the first-in first-out memory having an input connected to said second input port and an output connected to said second input port and an output connected to a first output port of the processing element;
the constant register file having an input connected to said second input port and an output connected to the input of said first multiplexer;
the multiplier having a first input connected to the output of said first multiplexer, a second input connected to the output of said second multiplexer, and an output connected to the inputs of said first register and said fourth multiplexer;

the adder having a first input connected to the output of said third multiplexer, a second input connected to the outputs of said second register, and an output connected to the inputs of said second register and said fourth multiplexer;

the absolute-difference operational element having a first input connected to said first input port, a second input connected to said second input port, and an output connected to the input of said third register;

a data register file having an input connected to the output of said adder and an output connected to an input of said third multiplexer and a tristate buffer;

the tristate buffer having a first input connected to the output of said data register file, a second input connected to the output of a decoder, and an output connected to a third output port of the processing element;

the first output port for sending feedback data being connected to the output of said first-in first-out memory;

the second output port for sending output data being connected to the output of said fourth multiplexer;

the third output port for sending wired-or feedback data being connected to the output of said tristate buffer;

the multiplexers, registers, first-in first-out memory, constant register file, adder, data register file, and decoder being all connected to control lines issued from a controller and a mode-control ROM for organizing various data transferring structures; wherein by using control signals to control said multiplexers, each pipelined processing element is able to have various operational modes;

an input broadcasting circuit, comprising a register and a multiplexer, having a first input connected to the output of a multiport memory, a second input connected to wired-or outputs of all the processing elements, and an output connected to said first input ports of all the processing elements;

a first input shift-register array, comprising registers and multiplexers, having an input connected to the output of said multiport memory, a group of inputs connected to said first output ports of all the processing elements, and another group of inputs connected to the outputs of a second input shift-register array;

the second input shift-register array comprising registers having an input connected to the output of the multiport memory and a group of outputs connected to the inputs of said first input shift-register array;

an output shift-register array, comprising registers and multiplexers, and having an output connected to the inputs of the multiport memory and external functional unit, a group of inputs connected to said second output ports of all the processing elements, and an input connected to said wired-or output ports of all the processing elements;

an output wired-or circuit having a group of inputs connected to said third output ports of all the processing elements, an output connected to said second input of said input broadcasting circuit, and an output connected to an input of said output shift-register array;

the multiport memory having a first input connected to an external host machine, a second input connected to the output of said output shift-register array, a first output connected to an input of said input broadcasting circuit, a second output connected to an input of said first input shift-register array, and a third output connected to an input of said second input shift-register array; and the controller generating control signals which are broadcast to said pipelined processing elements for the purpose of controlling the pipelined processing elements, said input broadcasting circuit, said input shift-register arrays, said output shift-register array, said output wired-or circuit, said multiport memory, and said external functional unit.

31. A two-dimensional pipelined SIMD-Systolic array processor, comprising: pipelined processing elements, registers, multiplexers, data switches, multiport memory and controller, and further including:

a two-dimensional processing array, comprising columns and rows of said pipelined processing elements, wherein each of said pipelined processing elements is arranged to operate independently of other processing elements in the array and comprises a multiplier, an adder, a register, a first input port for receiving vertical broadcasting data, a second input port for receiving horizontal broadcasting data, a first output port for sending computational results into an output shift-register array, and a second output port for sending computational results into a wired-or output circuit, and wherein an input end of the multiplier is connected with said first input port for receiving input data, an output end of the multiplier is connected with an input end of the adder, an output end of the adder is connected with the register, and an output end of the register is connected to another input end of the adder;

a first input shift-register array, comprising registers and multiplexers, said first input shift-register array having an input connected to an output of a multiport memory and outputs connected to said two-dimensional processing array, wherein each output is connected to said second input ports of all the processing elements in a same row for broadcasting data horizontally;

a second input shift-register array comprising registers, said second input shift-register array having an input connected to an output of the multiport memory and outputs connected to input of the multiplexer of said first input shift-register array;

a broadcasting register having an input connected to an output of the multiport memory and an output connected to said first input ports of all the processing elements in the leftmost column of said two-dimensional processing array for broadcasting data vertically;

a third input shift-register array, comprising register delays having an input connected to the output of said broadcasting register and outputs connected to said two-dimensional processing array, wherein each output is connected to said first input ports of all the processing elements in the same column for broadcasting data vertically, wherein each column of processing elements of said two-dimensional processing array has an output shift-register array connected to said first output ports, comprising registers and multiplexers for transferring computational results systolically into the multiport memory or its right neighboring column, the data switches being arranged to control data transferring between output shift-register arrays and said multiport memory when more than one output shift-register arrays are used, and wherein each column of processing elements of said two-dimensional processing array has a wired-or output circuit connected to said first input ports of all the processing elements in its right neighboring column for transferring intermediate computational results; and a controller generating control signals which are connected to said two-dimensional processing array for controlling said two-dimensional processing array, said input shift-register arrays, said input broadcasting register, said output shift-register arrays, said data switches, said wired-or output circuits, and said multiport memory.

32. A two-dimensional pipelined SIMD-Systolic array processor comprising a number of pipelined processing elements, registers, multiplexers, multiport memory and controller, and the processor further including:

a two-dimensional processing array, comprising columns and rows of said pipelined processing elements, wherein each of said processing elements is arranged to operate independently of other processing elements in the array and comprises a multiplier, an adder, a register, a data register file, a tristate buffer, a first input port for receiving broadcasting data from a broadcasting register or from a-wired-or output circuit, a second input port for receiving horizontal broadcasting data, a first output port for sending computational results into a wired-or output circuit, and wherein an input end of the multiplier is connected with said first input port for receiving input data, an output end of the multiplier is connected with an input end of the adder, an output end of the adder is connected with the register, an output end of the register is connected to another input end of the adder, an input end of the data register file is connected with an output end of the adder, an output end of the data register file is connected with an input end of the tristate buffer, and an output end of the tristate buffer is connected with said first output port;

an input shift-register array, comprising registers, said input shift-register array having an input connected to an output of a multiport memory and outputs connected to said two-dimensional processing array, wherein each output is connected to second input ports of all the processing elements in the same row for broadcasting data horizontally;

said broadcasting register having an input connected to an output of the multiport memory and an output connected to said first input ports of all the processing elements in the leftmost column of said two-dimensional processing array for broadcasting data vertically, wherein except the rightmost column, each column of processing elements of said two-dimensional processing array has a wired-or output circuit connected to said first input ports of all the processing elements in its right neighboring column for transferring intermediate computational results;

an output shift-register array, comprising registers and multiplexers, having inputs connected to said first output ports of all the processing elements in the rightmost column of said two-dimensional processing array for transferring computational results systolically into the multiport memory; and a controller arranged to generate control signals for controlling said two-dimensional processing array, said input shift-register array, said broadcasting register, said wired-or output circuits, said output shift-register array, and said multiport memory.

33. A two-dimensional pipelined SIMD-Systolic array processor comprising:

pipelined processing elements, registers, multiplexers, data switches, a multiport memory and a controller, and the processor further including:

a two-dimensional processing array, comprising columns and rows of said pipelined processing elements, wherein each of said processing elements is arranged to operate independently of other processing elements in the array and comprises an absolute-difference operational element, a register, an adder, a first input port for receiving vertical broadcasting data, a second input port for receiving horizontal broadcasting data, and a first output port for sending computational results into an output shift register array, and wherein an input end of the absolute-difference operational element is connected with the said first input port, an output end of the absolute-difference operational element is connected to an input end of the adder, an output end of the adder is connected with an input end of the register, and an output end of the register is connected to another input end of the adder;

a first input shift-register array, comprising registers and multiplexers, said first input shift-register array having an input connected to an output of the multiport memory and outputs connected to second input ports of all the processing elements in the same row for broadcasting data horizontally;

a second input shift-register array, comprising registers, said second input shift-register array having an input connected to an output of the multiport memory and outputs connected to inputs of multiplexers of said first input shift-register array;

a broadcasting register having an input connected to an output of the multiport memory and an output connected to said first input ports of all the processing elements in the leftmost column of said two-dimensional processing array for broadcasting data vertically;

a third input shift-register array, comprising register delays, having an input connected to the output of said broadcasting register and outputs connected to said two-dimensional processing array, wherein each output of the third input shift-register array is connected to said first input ports of all the processing elements in the same column for broadcasting data vertically, and wherein each column of processing elements of said two-dimensional processing array has an output shift-register array connected to said first output ports, comprising registers and multiplexers for transferring computational results systolically into said multiport memory;

data switches used for controlling data transferring between output shift-register arrays and said multiport memory; and a controller arranged to generate control signals for controlling said two-dimensional processing array, said input shift-register arrays, said broadcasting register, said data switches, said output shift-register arrays, and said multiport memory.

* * * * *